United States Patent
Dietz et al.

(10) Patent No.: US 11,713,995 B2
(45) Date of Patent: Aug. 1, 2023

(54) SYSTEM AND METHOD FOR MANAGING INVENTORY

(71) Applicant: Wincor Nixdorf International GmbH, Paderborn (DE)

(72) Inventors: Oliver Dietz, Borchen (DE); Stefan Schmelter, Paderborn (DE)

(73) Assignee: DIEBOLD NIXDORF SYSTEMS GMBH, Paderborn (DE)

( * ) Notice: Subject to any disclaimer, the term of this patent is extended or adjusted under 35 U.S.C. 154(b) by 0 days.

(21) Appl. No.: 17/055,169

(22) PCT Filed: May 15, 2019

(86) PCT No.: PCT/EP2019/062447
§ 371 (c)(1),
(2) Date: Nov. 13, 2020

(87) PCT Pub. No.: WO2019/219736
PCT Pub. Date: Nov. 21, 2019

(65) Prior Publication Data
US 2021/0223093 A1    Jul. 22, 2021

(30) Foreign Application Priority Data
May 16, 2018   (EP) .................................. 18172620

(51) Int. Cl.
*G01G 19/414*   (2006.01)
*G06K 7/10*   (2006.01)
(Continued)

(52) U.S. Cl.
CPC ..... *G01G 19/4144* (2013.01); *G06K 7/10297* (2013.01); *G06Q 10/087* (2013.01);
(Continued)

(58) Field of Classification Search
CPC ............... G01G 19/4144; G01G 19/40; G06K 7/10297; G06Q 10/087; G06Q 20/203; G06Q 20/208
See application file for complete search history.

(56) References Cited

U.S. PATENT DOCUMENTS 5,955,705 A * 9/1999 Germanton ............ G01G 21/22
177/253
9,916,561 B2 * 3/2018 Marathe ............... G06Q 10/087
(Continued)

FOREIGN PATENT DOCUMENTS

| AU | 201424256 A1 | 4/2015 | |
|---|---|---|---|
| DE | 202004020790 U1 | 2/2006 | |
| GB | 2517918 A * | 3/2015 | ........... G01G 21/283 |

OTHER PUBLICATIONS

Retail Self-Checkout and Security via Bagging Directly Into a Shopping Carton a Scale, Jan. 23, 2009, IP.com Prior Art Database Technical Disclosure (Year: 2009).*
(Continued)

*Primary Examiner* — Allen C Chein
*Assistant Examiner* — Aaron N Tutor
(74) *Attorney, Agent, or Firm* — Black McCuskey

(57) ABSTRACT

A system and a method for managing inventory are provided. The system may include: a plurality of weighing devices, at least a memory, and at least a processor. The weighing devices are configured to weight at least an object. The processor is configured to receive data from at least one weighing device relating to the at least one object weighed by the respective weighing device, and to store the received data in the memory. The processor is further configured to determine at least a matching of data received from a first weighing device with data received from a second weighing device.

15 Claims, 11 Drawing Sheets

(51) Int. Cl.
*G06Q 10/087* (2023.01)
*G06Q 20/20* (2012.01)
*G01G 19/40* (2006.01)

(52) U.S. Cl.
CPC ......... *G06Q 20/203* (2013.01); *G06Q 20/208* (2013.01); *G01G 19/40* (2013.01)

(56) References Cited

U.S. PATENT DOCUMENTS

| | | | |
|---|---|---|---|
| 2014/0262550 A1* | 9/2014 | Santi | G01G 19/12 |
| | | | 177/136 |
| 2016/0363475 A1* | 12/2016 | Bedetti | G01G 23/00 |
| 2018/0240180 A1* | 8/2018 | Glaser | G06Q 30/0639 |

OTHER PUBLICATIONS

European Search Report from European Patent Office for corresponding application EP18172620, dated Oct. 31, 2018.

* cited by examiner

FIG. 4A
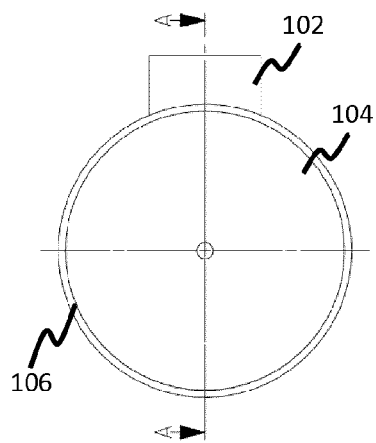
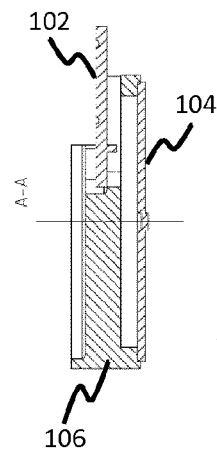
FIG. 4B
FIG. 4C
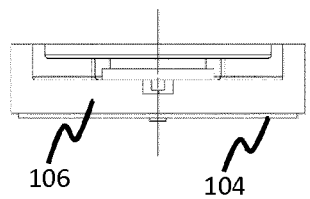
FIG. 4D
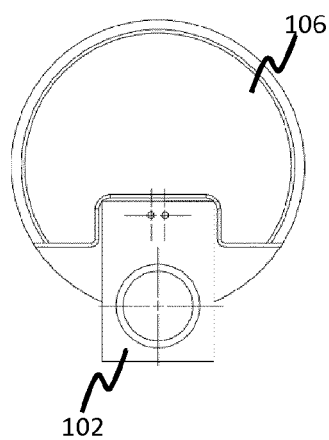

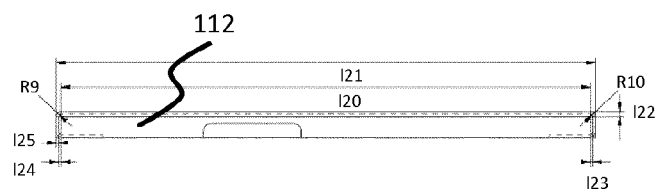
FIG. 9B
FIG. 9A
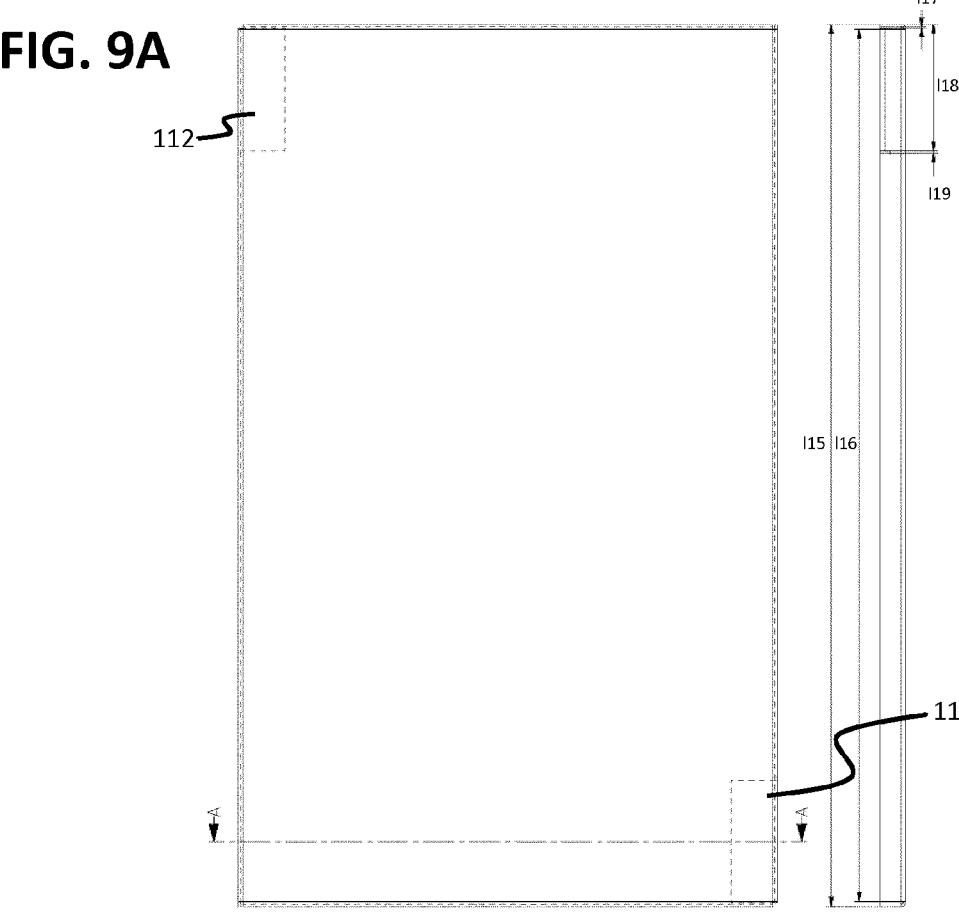
FIG. 9C
FIG. 9D
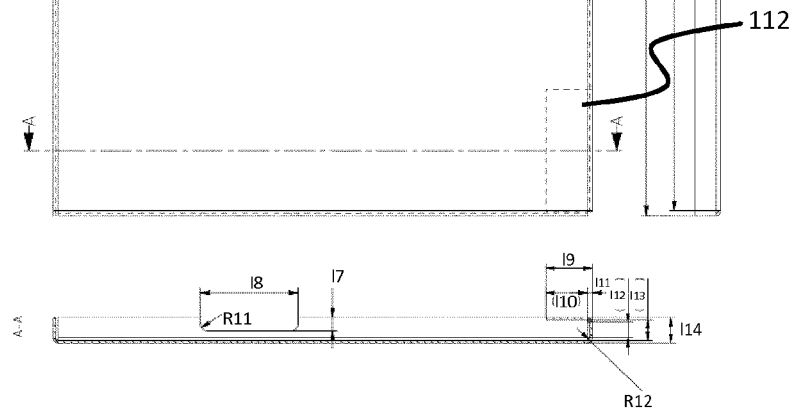

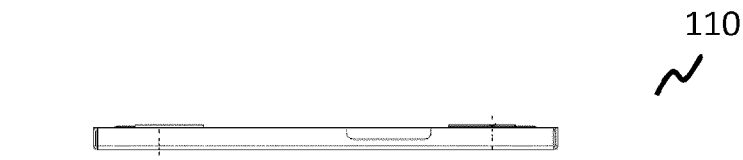
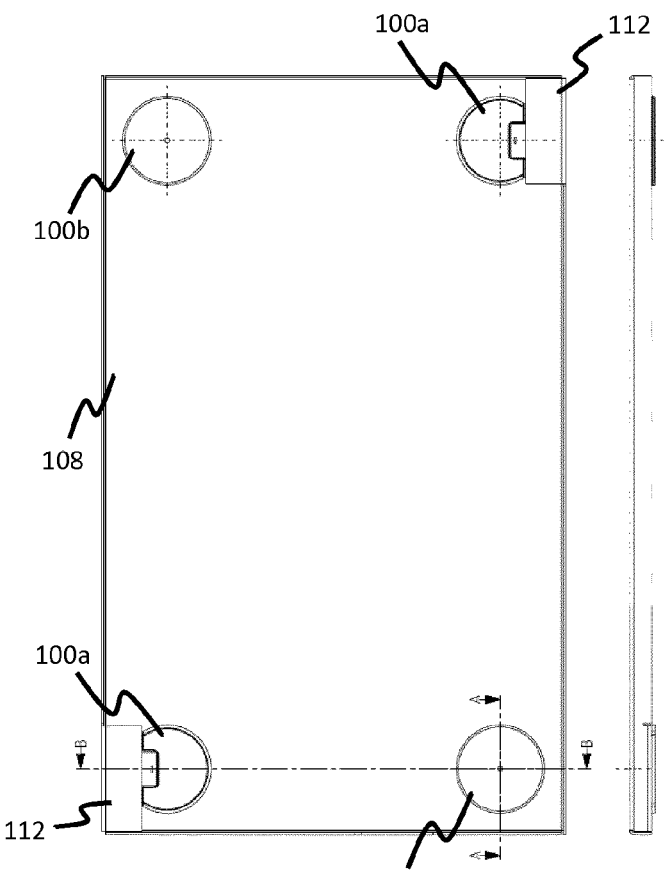
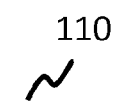
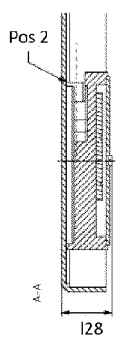
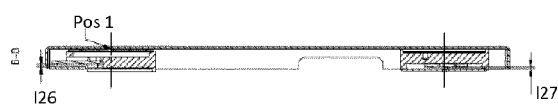
FIG. 10B
FIG. 10A
FIG. 10C
FIG. 10E
FIG. 10D

SYSTEM AND METHOD FOR MANAGING INVENTORY

Various embodiments relate generally to a system and a method for managing inventory.

In recent times, there is a considerable demand by customers for accelerating a time spent for shopping, for example, in retail stores, and making shopping more pleasant for customers. However, in some systems, a variety of different sensors are used, for example, cameras, microphones, digital image processing, and sensors for registration processes of customers. Conventional systems are complex, and, a use of many different sensors is cost-intensive. Further, the use of cameras may not comply with the requirements from the right to privacy. In addition, in general, cashiers are necessary at least for scanning bought inventory and for performing payment procedures. As a consequence, customers spend a lot of time in checkout lines.

Therefore, in various embodiments, it may be provided a minimization of long checkout lines and to make traditional checkout lines superfluous in retail stores using a self-checkout solution. Further, in various embodiments, an inexpensive modular and automatic system may be provided in retail stores. Moreover, a store architecture may be provided, which may allow a use of a weighing device by integration in a plurality of devices, for example, shelves, fresh food scales, Point Of Sales, and shopping trolley. In various embodiments, the system may allow low wireless communication traffic because data traffic between components in the system may be kept low while collection of inventory takes place. In addition, the system may provide an anti-theft protection, determination of information in view of actual balances for logistic purposes, e.g., in a retail store, and may provide an optimal conservation of inventory.

In various embodiments, a system for managing inventory may include a plurality of weighing devices, at least a memory, and at least a processor. The weighing devices may be configured to weigh at least an object. The processor may be configured to receive data from at least a weighing device relating to the at least one object weighed by the respective weighing device, and to store the received data in the memory. The processor may be further configured to determine at least a matching of data received from a first weighing device with data received from at least a second weighing device.

In various embodiments, a trolley may include the first weighing device and a shelf may include the second weighing. The processor may be configured to receive data from a plurality of weighing devices which may be arranged, for example, in a store.

In various embodiments, the data may include at least a weight difference. The data may include a weight difference, and an identification, identifying at least a trolley or shelf.

The plurality of weighing devices may be configured such that all weighing devices include a single type of device for measuring the weight of the objects.

The plurality of weighing devices may include each a plurality of devices for measuring forces. The plurality of devices for measuring forces may be modular with each other, such that a first device for measuring forces in a first weighing device may be exchanged by a second device for measuring forces in a second weighing device and vice versa.

Each of the plurality of weighing devices may be configured to include a plurality of devices for measuring forces. The devices may be configured to include at least a sensor, a force input device, and a casing.

A device for measuring forces may include at least one sensor, at least one force input device configured to elastically deform in relation to an external force acting on the device, and a casing coupled to the sensor and the force input device. The sensor may be configured such that, in case the force may be applied to the device, the sensor may detect the force in relation to the elastic deformation of the force input device. The casing may be configured to accommodate the sensor in the casing in at least two different positions.

The force input device may be implemented as a thin circular plate, which may be deformed elastically, for example, may be bent due to a force or load which may be applied to the force input device.

The casing and the force input device may be implemented in a single device or in one single part.

The sensor may be an inductive sensor. The force input device may be made from an electric conductive material. The sensor may detect or measure, for example, a voltage due to a movement of a conductive material next to the sensor or at least one coil of the sensor. An extremely robust device for measuring forces may be achieved.

The sensor may include at least one of a coil, a magnetic core, an oscillator, a demodulator, a flip-flop, a comparator, an output stage, and a printed circuit board. The sensor may include at least an induction loop or coil. Using electric current, a magnetic field may be generated in the induction loop, which may collapse due to a conductive material next to the induction loop. The inductance of the loop may change according to the material inside it, and since metals are more effective inductors than other materials, a presence of metal may increase the current flowing through the loop. This change may be detected by a sensing circuitry. Inductive sensors may work without contact, and they detect metal objects that move into their measuring field. An oscillator may generate by means of an oscillating circuit an electromagnetic alternating field, which may emerge from the active surface of the sensor. In each approaching metal object, vortex currents may be induced, which reduce energy from the oscillator. This may result in a change in level at the oscillator output, which may be configured to switch the output stage, for example, for a digital sensor via a trigger, for example, a Schmitt-trigger, or may influence an analog output signal for measuring a force or load as a function of the object distance. In other words, an inductive sensor may be used for non-contact detection of metallic objects. The operating principle may be based on a coil and an oscillator that may create an electromagnetic field in the surroundings or close surroundings of the sensing surface. The presence of a metallic object, for example, a force input device or actuator, in the operating area may cause a dampening of the oscillation amplitude. The rise or fall of such oscillation may be identified by a threshold circuit, which may change the output of the respective sensor, which may be analog or digital. The operating distance of the sensor may depend on the force input device's shape and may depend on the used material of the force input device.

In various embodiments, the force input device may have characteristics of a cup-spring, which allows elastic deformation.

A system for measuring forces may include a metal target, at least a sense coil, at least a capacitor, a gain control, a demodulator, and an amplifier. The metal target may be a force input device and/or a portion of the support panel, for example, a U-turned portion of the support panel. An inductor-capacitor (LC) tank circuit may be pumped by an oscillator. The inductor may be made from a sensing coil (coil L and resistor RS). In case a conductive metal object, for example, a metallic plate or metallic support panel, may be brought near the sensing coil, eddy currents may be formed in the object as a function of the distance between the sensing coil and the object, the material of the object, and the size of the object. A distance between the sensing coil and the metal target, which may be a distance between the sensor and a portion of the support panel or a distance between the sensor and the force input device, may be changed by applying a force on the device for measuring forces. The eddy currents may form an opposing magnetic field that may have an effect of reducing the oscillation amplitude. The apparent effect may be that a parallel resonance impedance $R_P=L/R_SC$ of the tank circuit may be changed. L may be the coil inductance in henrys, $R_S$ may be the coil series resistance in ohms, and C may be the parallel capacitance in farads. A demodulator may be placed following the tank to digitalize the resultant direct current value using an analog-digital converter. As $R_P$ may change, the amplitude of the tank may diminish. The demodulator may be followed with a closed-loop control system to maintain the LC tank's oscillation amplitude. In case a metal object may move closer to the sense coil, the opposing magnetic field may require more drive current into the tank, which may be accurately measured, and which may be dependent on an acting force on the device for measuring forces. A wide dynamic range in measuring RP may be provided and an overall performance may be improved.

The sensor may be enclosed by the casing or the sensor may be partially enclosed by the casing. In case the sensor may be enclosed by the casing, the sensor may be fully integrated in the casing. No component of the sensor may protrude from an outer surface of the casing, for example, in case viewed from a top view and/or a side view. In case the sensor is partially enclosed by the casing, at least a portion of the sensor may protrude from the casing, for example, in case viewed from a top view and/or a side view.

In various embodiments, the sensor may be a capacitive sensor.

The sensor may further include an integrated Radio Frequency Identification (RFID) communication device, configured such, that depending on the acting force, the sensor communicates data to an external device using the integrated RFID communication device. The RFID communication device may communicate data to a communication device of, for example, a trolley or shelf. The RFID communication device may have an embedded transmitter and receiver. However, any other form of RFID communication device having the same or equal electronic characterization may be used instead. The actual RFID component may include at least two parts: an integrated circuit for storing and processing information, and an antenna for receiving and transmitting at least one signal. The RFID communication device may include a non-volatile memory, and may include either fixed or programmable logic for processing transmission and sensor data. The RFID communication device may be passive, active, or battery-operated.

The RFID communication device may use radio energy transmitted, for example, by an external device. An active RFID communication device may feature an onboard battery, which may periodically transmit its credentials. A RFID communication device may be part of each sensor in a device for measuring forces. Each sensor may be configured to transmit detected force data to a central electronic device and/or to a reader.

The sensor may include an integrated Wireless Local Area Network communication device (WLAN communication device) and/or an integrated Bluetooth communication device for communicating data with an external device or for communicating data with at least a further sensor of a plurality of devices for measuring forces. However, it will be appreciated that any suitable communication may be used instead.

The force input device may include a circular disk shape. The force input device may be of an elastic material. At least one protrusion may be provided at a center position of the force input device. The protrusion may be orientated away from the casing in case assembled with the casing. The at least one protrusion may be part of the force input device or may be glued to the force input device. In case the at least one protrusion may be part of the force input device, the force input device may be manufactured using, for example, a milling process and/or grinding process. The force input device may be in contact with or be coupled to a support panel using the protrusion. The support panel may be of an elastic material. The force input device may be in contact with a ground on which the device or the weighing device may be positioned.

The force input device may include a first portion and a second portion. The first portion may be manufactured in one piece. The force input device may, for example, have a diameter in a range of about 35 mm to 45 mm, e.g. of about 40 mm. The second portion may be provided as a cam or a protrusion and may, for example, have a diameter in a range of about 2 mm to 3 mm, e.g. of about 2.4 mm. In various embodiments, the first portion may have a height in a range of about 0.5 mm to 1.5 mm, e.g. of about 1 mm. The second portion may have a height in a range of about 0.3 mm to 0.8 mm, e.g. of about 0.5 mm.

The first portion and the second portion may be separate entities. The first portion and the second portion may be connected using glue, for example, Cyanoacrylate, for example, Loctite 401 or Loctite 406. However, any other type of connection having the same or equal mechanical characterization may be used instead. The first portion may have a height or thickness in a range of about 0.6 mm to 1.0 mm, e.g. of about 0.8 mm. The first portion may have a height or thickness in a range of about 0.3 mm to 0.8 mm, e.g. of about 0.5 mm. In case, the first portion may have a height or thickness in a range of about 0.6 mm to 1.0 mm, e.g. of about 0.8 mm, or in case, the first portion may have a height or thickness in a range of about 0.3 mm to 0.8 mm, e.g. of about 0.5 mm, the second portion or cam may have a diameter in a range of about 2.2 to 2.6 mm, e.g. of 2.4 mm, and may have a height in a range of about 0.8 mm to 1.2 mm, e.g. of 1 mm.

The material used for the first and second portions may be steel, for example, soft metal or soft steel, suitable for cold forming, for example, B1 EN 10131-1.00-DC01=1.0330 EN 10130. However, any other material having the same or equal mechanical characterization may be used instead.

The force input device and/or the sensor may be coupled to the casing using glue. The force input device and/or the sensor may be coupled to the casing using at least a screw, a rivet, or other known joining techniques. The sensor 102 and/or the force input device 104 may be clamped to the casing. However, any other material having the same or equal mechanical characterization may be used instead.

The force input device and the casing may be arranged concentrically. In other words, the force input device and the casing may be arranged in a way in which the force input device may be positioned on a surface of the casing. A central point of the force input device and a center of a recess or a cavity may be positioned on one line.

The casing may include a circular cylindrical shape of a predetermined height. A first side of the casing may include a recess of a predetermined depth. A second side of the casing may include a first recess of a predetermined depth and a second recess of a predetermined depth. The casing may include a step of a predetermined height, and a recess of a predetermined length. The casing may further include an elongated hole of a predetermined depth. The casing may be manufactured using injection molding, for example, plastic injection molding or a milling process.

The casing may be made of Polyamide 12, and/or the force input device may be made of steel. However, any other material having the same or equal mechanical characterization may be used instead.

The force input device may be made of stainless steel and/or spring steel. A device for measuring forces may be operated by at least a battery or may be operated by a power supply. A device for measuring forces may output analog and/or digital values. The device for measuring forces may convert analogous measured values to digital output values, for example, by use of at least one analog-digital converter. The device for measuring forces may at least include a processor and/or a memory. The device for measuring forces may at least communicate with an external device or a processing device using a wireline connection and/or a wireless communication, for example, Wireless Local Area Network (WLAN) or Bluetooth. However, it will be appreciated that any suitable communication may be used instead.

A weighing device for weighing of objects may include a plurality of devices for measuring forces, and at least one support panel. Each device for measuring forces may be arranged at an edge corner portion of a first surface of the support panel, respectively. The devices may be coupled to the first surface of the support panel such, that at least one device may be coupled to the support panel using a first side of the device, and that at least one further device may be coupled to the support panel using a second side of the further device. The second side may be an opposite side of the first side. In other words, in various embodiments, each of the devices for measuring forces may be positioned next to intersection points of side edges of the support panel. A first side of the device may be a top surface of the device and a second side of the device may be a bottom surface of the device and vice versa.

Adjacent devices of the plurality of devices arranged on the support panel may be coupled to the support panel using alternating the first side of the device and the second side of the device. In other words, adjacent devices for measuring forces may be positioned such that their orientation may be turned by 180 degrees in relation to a surface of the support panel. Still in other words, the orientation of adjacent devices for measuring forces may be such that in relation to an axis which may intersect the longitudinal axis of a device for measuring forces and which may be orthogonal to the longitudinal axis of a device for measuring forces adjacent devices may be turned in an angle of about 180 degrees in relation to the axis.

The support panel may include a plate shape of a predetermined height and may be made of an electric conductive material. At least one edge portion of the support panel may include a U-turned portion. The U-turned portion may be configured to partially overlap at least one device of the plurality of devices. The U-turned portion of the support panel and the at least one sensor may be configured such that, in case a force may be applied to the force input device using the support plate, the at least one sensor may measure a change in an electromagnetic field generated by the sensor due to movement of the respective U-turned portion. The sensor may be partially enclosed by the casing. The U-turned portion may be position such that the U-turned position may be positioned next to a step in the casing.

A portion of the support panel may be L-shaped. An angle of the L-shaped support panel may be in a range of about 80 to 100 degrees, e.g. about 90 degrees. The casing may merely partially enclose the sensor, so that at least a portion of the sensor, for example, at least a coil or sensing coil, may protrude from the casing and may be oriented towards the U-turned portion to interact with the U-turned portion of the support panel. The U-turned portion may include the same material, for example, conductive material, such as metal, as the support panel. The U-turned portion may include a material, for example, conductive material, such as metal, but the support panel may include a material, which may differ from the material of the U-turned portion. The U-turned portion may be a separate component and may be coupled to the support panel, for example, by glue, at least a screw connection, at least a rivet joint connection. However, any other connection type having the same or equal mechanical characterization may be used instead.

The sensor may be positioned in the casing such that at least a coil of the sensor may be arranged next to, for example above or beneath, the force input device, such, that the sensor may detect a movement of the force input device due to an influence of an acting force. The sensor may include at least one circular arranged coil. The coil may be concentric to a circular force input device. The sensor and a portion of the U-turned portion of the support panel may have a distance of about 0.5 to 1.5 mm, e.g. of about 1 mm.

At least two U-turned portions may be provided at the support panel, and, the U-turned portion may be arranged such, that the U-turned portions may be arranged diagonally to the support panel which may be, for example, of a rectangular or a quadratic shape. In various embodiments, at least an edge portion of the support panel may be bent in an angle in a range of about 80 to 100 degrees, e.g. of about 90 degrees. At least an edge portion of the support panel may be bent in an angle in a range of about 80 to 100 degrees, e.g. of about 90 degrees, to protect the at least one device for measuring forces and/or at least a sensor from contamination. At least two U-turned portions, or in other words, horseshoe shaped portions, may be provided at the support panel, which may be diagonally positioned at edge portions in relation to a rectangular support panel. At the remaining edges no U-turned portions may be provided. At the remaining edge portions, L-shaped portions may be provided.

A portion of the support panel may be configured to accommodate an electronic device. The electronic device may be configured to communicate with at least one sensor of the at least one device. The electronic device may further be configured to communicate data to an external device using RFID transmission. The electronic device may include a printed circuit board. The electronic device may be positioned at a central portion of the support panel. The electronic device may be positioned on a side of the support panel which is an opposite side to the weighing side on which at least an object to be weighed may be put. The electronic device may receive measured values from at least a device for measuring forces and process or transmit analog and/or digital values. The electronic device may be glued to the support panel. The electronic device may convert analogous output values of at least one device for measuring forces to digital values, for example, by use of at least an analog-digital converter. The electronic device may be operated using at least a battery or a power supply. The electronic device may be configured to communicate with at least one sensor of the at least one device, and the electronic device may further be configured to communicate data to an external device using, for example, a Wireless Local Area Network communication (WLAN-communication) or Bluetooth communication. However, it will be appreciated that any suitable communication may be used instead.

At least one device may be coupled to the support panel using glue. In various embodiments, the glue may be Cyanoacrylate (CA), for example, Loctite 401 or Loctite 406. The at least one device may be coupled to the support panel using at least a screw, a rivet, or other joining techniques known by the skilled person.

The material used for the first and second portions of the force input device may be steel, for example, soft metal or soft steel, suitable for cold forming, for example, B1 EN 10131-1.00-DC01=1.0330 EN 10130, and the material of the casing may be Polyamide (PA) 12, the material of the support panel may be steel, for example, soft metal or soft steel, suitable for cold forming, for example, B1 EN 10131-1.00-DC01=1.0330 EN 10130. The sensor may include at least a coil and a printed circuit board. The casing, the sensor, and the force input device may be coupled using glue, for example, Cyanoacrylate, for example, Loctite 401 or Loctite 406. The weighing device may be operated by at least one battery or may be operated by a power supply.

A weighing device may include a support panel and four devices for measuring forces. In each edge portion of the rectangular support panel at least one device for measuring forces may be positioned. Adjacent devices for measuring forces may be arranged in opposite directions such, that a first side of a casing of a first device may be oriented in a first direction, for example, towards the support panel, and such, that a first side of a casing of a second device, which may be adjacent to the first device, may be arranged in a second and opposite direction, for example away from the support panel. The devices and the support panel may be connected using glue. A sensor and a force input device may be coupled to a respective casing by glue. Two devices for measuring forces may be configured such, that respective sensors may be contained in the casing such, that no portion of the sensor may protrude out of a furthest edge portion of the casing in case viewed from a top view and/or a side view. The respective devices for measuring forces may be arranged diagonally in relation to the support panel.

Two devices for measuring forces may be configured such, that portions of the respective sensors may protrude out of a furthest edge of the casing in case viewed from a top view and/or from a side view. The respective devices for measuring forces may be arranged diagonally in relation to the support panel. At positions where the sensors may protrude the respective casing portions of the support panel, the support panel may have a U-turned shape. At positions where the sensors may protrude the respective casing portions of the support panel, a first side of the casing of the device for measuring forces may stand on a ground, and the opposite side of the casing may be coupled to the support panel via a force input device. Between a surface of the U-turned portion facing the sensor, and between the sensor or a sensing coil, an air section may be provided. In various embodiments, in case a force may be applied on the support panel, the distance, for example, an air section, between a surface of the U-turned portion of the support panel and a sensor, for example, a sensing coil, may be increased. In case a force may be removed from the support panel, the distance, for example, an air section or gap, between a surface of the U-turned portion of the support panel and a sensor, for example, a sensing coil, may be decreased. In various embodiments, at positions where the sensors may not protrude the respective casing portions of the support panel, a first side of the casing of the device for measuring forces may be coupled with the support panel. At positions where the sensors may not protrude the respective casing portions of the support panel, a second side of the casing of the device for measuring forces may be coupled via a force input device to a ground. At positions where the sensors may not protrude the respective casing portions of the support panel, the sensor, for example, a sensing coil, may be positioned in the casing of the device for measuring forces and may be arranged concentrically to the circular force input device. In case a force may be applied on the support panel, the force input device may be bent, and an air section between the sensor, for example, a sensing coil, and between the input force device may decrease. In other words, the force input device may be bent such that a central portion, for example, at a middle point position, of the force input device may be bent most. In case a force may be removed from the support panel, the distance, for example, an air section or gap, between the force input device and the sensor, for example, a sensing coil, may increase. Each sensor may output a measuring value, for example, an analog voltage or digital value, indicating the force or load recorded at each position of a device. In case the force input device may approach the sensor, the sensor output may output an increasing analog voltage value or may output a decreasing analog voltage value or a digital value. In case the U-turned portion of the support panel may depart from the sensor, the sensor output may output an increasing analog voltage value or may output a decreasing analog voltage value or a digital value. An average of the measured values generated by a plurality of devices for measuring forces may be calculated using, for example, a processor. A position of objects on the support panel may be calculated by capturing approximately simultaneously each output value of each sensor and performing mathematical evaluation of the captured output values measured by the plurality of devices for measuring forces. An intersection point of output parables of sensor output values of at least two adjacent devices of a plurality of devices may define a minimal resolution of the sensor system including a plurality of devices for measuring forces. At least a force applied to the support panel may be calculated by mathematically adding the respective single output values of the plurality of sensors.

It may be achieved by the device for measuring forces and a weighing device to change a currently available Point Of Sale (POS) in a way that a manual capturing of inventory by a cashier may be omitted. A high level of automation may be achieved. The capturing of inventory, for example, food and/or their weight may be provided by determining or measuring a change in weight, for example, in a shopping trolley or on shelves. An inventory, for example, in a supermarket, may be available at all times, and automatic reordering of inventory may be provided. Further, the content of a shopping trolley may be available at all times. The device may be standardized and versatile applicable as it may be used for measuring forces, for example, in shopping trolleys, in scales, and in shelves.

In various embodiments, a casing of the device may be configured such, that it may accommodate the sensor in at least two different ways. The device for measuring a force may be used modular in a plurality of weighing devices, independent from the type of weighing device. The device for measuring forces may have a simple construction with a minimum number of components. There may be no need of prefabricated food, for example, prefabricated vegetables and fruits, which means, that food may be weighed by the device without packaging. The user or customer, for example, a client in a supermarket, must not have any concern that a weight of an object may also incorporate the weight of the respective packaging of a prefabricated food. Therefore, the user will highly benefit from using of the device for measuring forces. Using a plurality of devices for measuring forces, a total measuring range may be divided in at least two partial measuring ranges. Each partial measuring range may be covered by at least one device for measuring forces of the plurality of devices for measuring forces with high accuracy. Due to a specific arrangement of a plurality of devices for measuring forces, it may be possible to achieve that each device for measuring forces may be operated in an optimal device sensing range, and a high accuracy of measurement of forces may be achieved. The use of a plurality of sensors in at least different positions at a support panel may allow an optimization of a sensor measurement range of the sensor. Therefore, an optimization of the sensor accuracy may be achieved. By measuring the change of weight in a shopping trolley, it may be identifiable, which inventory a customer has or a plurality of customers have added in the basket of their shopping trolley, for example, on a specific day, month or in another predetermined period of time. Due to the optimized mechanical characteristics of the device for measuring forces, the device may be installed in shelves, scales and weighing devices for fresh products. Only a single standardized device for measuring forces or casing may be used to accommodate sensor at different positions in the casing, and thereby increasing modularity.

In various embodiments, the material used for the first and second portions may be steel, for example, soft metal or soft steel, suitable for cold forming, for example, B1 EN 10131-1.00-DC01=1.0330 EN 10130. However, any other material having the same or equal mechanical characterization may be used instead.

The force input device and/or the sensor may be coupled to the casing using glue. The force input device and/or the sensor may be coupled to the casing using at least a screw, a rivet, or other known joining techniques. The sensor 102 and/or the force input device 104 may be clamped to the casing. However, any other material having the same or equal mechanical characterization may be used instead.

A weighing device for weighing of objects may include a plurality of devices, and at least one support panel. Each device may be arranged at an edge corner portion of a first surface of the support panel, respectively. The devices may be coupled to the first surface of the support panel such, that at least one device may be coupled to the support panel using a first side of the device, and that at least one further device may be coupled to the support panel using a second side of the further device. The second side may be an opposite side of the first side. In other words, each of the devices for measuring forces may be positioned next to intersection points of side edges of the support panel. A first side of the device may be a top surface of the device and a second side of the device may be a bottom surface of the device and vice versa.

Adjacent devices of the plurality of devices arranged on the support panel may be coupled to the support panel using alternating the first side of the device and the second side of the device. In other words, some devices for measuring forces may be positioned such that their orientation may be turned by 180 degrees in relation to other adjacent device. Still in other words, the orientation of adjacent devices for measuring forces may be such that in relation to an axis which may intersect the longitudinal axis of a device for measuring forces and which may be orthogonal to the longitudinal axis of a device for measuring forces adjacent devices may be turned in an angle of about 180 degrees in relation to the axis. First devices for measuring forces which may be arranged in an opposite direction to second devices, may include sensor which protrude from the casing. The sensor may be in interaction with a U-turned portion of a support panel. In various embodiments, second devices for measuring forces may not protrude from the casing. The sensors may be in interaction with a surface of the force input device.

First devices for measuring forces which may be arranged in an opposite direction to second devices, may include respective sensors which may not protrude from the casing. The sensors may be in interaction with a surface of the force input device. Second devices for measuring forces may include sensors which protrude from the casing. The sensor may be in interaction with a U-turned portion of a support panel.

The sensor may be positioned in the casing such that at least one coil of the sensor may be arranged adjacent to the force input device, so that the sensor may detect a movement of the force input device due to an influence of an acting force on a support panel.

It may be achieved by the device for measuring forces and a weighing device to change a currently available Point Of Sale (POS) in a way that a manual capturing of inventory may be omitted, but a high level of automation may be provided. A high level of automation may be achieved. The capturing of a weight difference of inventory may be provided by determining or measuring a change in weight, for example, in a shopping trolley or on shelves. An inventory, for example, in a supermarket, may be available at all times. Further, the content of a shopping trolley may be available at all times. The device may be standardized and versatile as it may be used for measuring forces, for example, in shopping trolleys, in scales, and in shelves. A casing of the device may be configured such, that it may accommodate the sensor in at least two different ways.

The device for measuring a force may be used modular in a plurality of weighing devices, independent from the type of weighing device. The device for measuring forces may have a simple construction with a minimum number of components. There may be no need of prefabricated food, for example, prefabricated vegetables and fruits, which means, that food may be weighed by the device without packaging. The user or customer, for example, a client in a supermarket, must not have any concern that a weight of an object also incorporates the weight of the packaging of a prefabricated food. Therefore, in various embodiments, the user will benefit from using of the device for measuring forces. Using a plurality of devices for measuring forces a total measuring range may be divided in at least two partial measuring ranges. Each partial measuring range may be covered by at least one device for measuring forces of the plurality of devices for measuring forces with high accuracy. Due to a specific arrangement of a plurality of devices for measuring forces, it may be possible to achieve that each device for measuring forces may be operated in an optimal device sensing range, and a high accuracy of measurement of forces may be achieved. The customer of the sensor in at least different positions in the casing allows an optimization of a sensor measurement range of the sensor. Thus, an optimization of the sensor accuracy may be achieved. By measuring the change of weight in a shopping trolley, it may be identifiable, which inventory or products a customer has or a plurality of customers have added in the basket of their shopping trolley. Due to the optimized mechanical characteristics of the device for measuring forces, the device may be installed in shelves, scales and weighing devices for fresh products. Only one standardized device for measuring forces or casing may be used to accommodate sensor at different positions in the casing, and thereby increasing modularity.

The sensor may be an inductive proximity sensor. In various embodiments, the sensor may measure, for example, a voltage due to a movement of a conductive material next to the sensor or at least one coil of the sensor. An extremely robust device for measuring forces may be achieved.

A weighing device may include at least a strain gauge which may take advantage of the physical property of electrical conductance and its dependence on the conductor's geometry. By way of example, in case an electrical conductor, coupled to an elastic portion of the weighing device, may be stretched within the limits of its elasticity, for example due to an applied force, such that it may not break or permanently deform, it may become narrower and longer, and it may increase its electrical resistance end-to-end, which may be detected using an electric circuit or processor. Conversely, in case an electrical conductor, coupled to an elastic portion of the weighing device, may be compressed such that it does not buckle, it will broaden and shorten, and it may decrease its electrical resistance end-to-end, which may be detected using an electric circuit or processor. From the measured electrical resistance of the strain gauge, the amount of induced stress may be inferred.

A weighing device may include four devices for measuring forces. The devices for measuring forces may be coupled to a support panel.

A weighing device for weighing of inventory may include a plurality of devices, and at least one support panel. Each device may be arranged at an edge corner portion of a first surface of the support panel, respectively. The devices may be coupled to the first surface of the support panel such, that at least one device may be coupled to the support panel using a first side of the device, and that at least one further device may be coupled to the support panel using a second side of the further device. The second side may be an opposite side of the first side. In other words, in various embodiments, each of the devices for measuring forces may be positioned next to intersection points of side edges of the support panel. A first side of the device may be a top surface of the device and a second side of the device may be a bottom surface of the device and vice versa.

Adjacent devices of the plurality of devices arranged on the support panel may be coupled to the support panel using alternating the first side of the device and the second side of the device. In other words, adjacent devices for measuring forces may be positioned such that their orientation may be turned by 180 degrees in relation to a surface of the support panel. Still in other words, the orientation of adjacent devices for measuring forces may be such that in relation to an axis which intersects the longitudinal axis of a device for measuring forces and which may be orthogonal to the longitudinal axis of a device for measuring forces adjacent devices may be turned in an angle of about 180 degrees in relation to the axis.

The plurality of weighing devices and the processor may be configured to communicate data using a near field communication device.

The weighing devices and the processor may include an integrated Radio Frequency Identification (RFID) communication device, configured such, that depending on the acting force, the sensor communicates data to an external device using the integrated RFID communication device. The RFID communication device may be a tag, which may have an embedded transmitter and receiver. However, any other form of RFID communication device having the same or equal electronic characterization may be used instead. The actual RFID component contained in a tag may include at least two parts: an integrated circuit for storing and processing information, and an antenna for receiving and transmitting at least one signal. The RFID tag may include a non-volatile memory, and may include either fixed or programmable logic for processing transmission and sensor data. The RFID communication device may be passive, active, or battery-operated.

The RFID communication device may use radio energy transmitted, for example, by the reader. An active RFID communication device may feature an onboard battery, which may periodically transmit its credentials. A RFID communication device may be part of each sensor in a device for measuring forces. Each sensor may be configured to transmit detected force data to a central electronic device and/or to a reader.

The sensor may include an integrated Wireless Local Area Network communication device (WLAN communication device) and/or an integrated Bluetooth communication device for communicating data with an external device or for communicating data with at least a further sensor of a plurality of devices for measuring forces. However, it will be appreciated that any suitable communication may be used instead.

The weighing devices may be configured to transmit at least data relating to a change of weight determined by the weighing device to the processor, and at least a timestamp. The timestamp may be configured such that it may be generated in case a change of weight may be determined by the at least one weighing device.

The weighing device may be configured to transmit at least data relating to a change of weight or a difference in weight determined by the weighing device to the processor, and at least a timestamp. The timestamp may be a consecutive number generated using a quartz. In other words, using the quartz, the timestamp or a current time may be generated. Using the quartz, the timestamp or a current time and a date or date specification may be generated. The timestamp may be configured such that it may be generated in case a change of weight may be determined by the at least one weighing device and at least an identification, for example, an identification number of a shelf or trolley from which an inventory was removed or to which an inventory was added. The value provided by the quartz is a respective timestamp which is calibrated with the time of the whole system upon entering and exit of the customer and thus in a short distance. Thus, both systems, weighing device and hard-wired systems are always synchronous. Thus, usually no large gap will develop.

The timestamp may be or may include a current time. The current time may be stated in days and/or hours and/or minutes and/or seconds and/or milliseconds. The timestamp may be a value, and may be generated or taken from a clock of a generating device, from a process or from a personal computer. The timestamp may be a digital value. In various embodiments, the data may further include identifier which may identify a current customer, a current shopping trolley, or a current shelf. In various embodiments, the data may be transmitted from a trolley to a shelf, from a shelf to a trolley, from a shelf to a back office, or from a trolley to a back office.

The system may further include at least a trolley. The trolley may be configured to include at least a weighing device.

The trolley may be a shopping trolley, and may include at least a basket. At least a weighing device may be positioned in the basket. The trolley may further include at least a communication device for transmitting data, for example, to a back office, a computer or a server. A trolley may be a device which may be pushed by a customer in a retail store, and in which the customer may put inventory he would like to buy in the retail store.

The trolley may be configured to include a Radio-Frequency-interface (RF interface). The trolley may be configured to include a wireless communication, for example, Infrared (IR), Near Field Communication (NFC), cellular, satellite, Bluetooth, WiFi etc., or other connection technologies.

The weighing device may be configured to be mechanical uncoupled such that it may only measure the content in a basket of the trolley.

The weighing device may not be influenced by external influences, for example, a weight of the trolley or a weight of a customer, and, thus, may be independent from a mass of the trolley or the customer.

The system may further include a plurality of shelves. The shelves may be each configured to include at least a weighing device.

A shelf may be a platform, on which at least one weighing device may be positioned. Inventory may be positioned and/or put on a weighing device. The weighing device may be positioned on and/or fixed at a shelf.

The system may further include a back office. The back office may include the processor and/or the memory. The memory may include at least a data set.

The back office may be positioned in the store. The back office may be positioned external the store. The back office may include a processor and a memory. In the memory a plurality of data sets, for example, data in relation to a weight difference and/or a timestamp, may be stored. The back office may be coupled to a data bank or server or cloud.

The store may include at least one of an entrance, an exit, a separation, a checkout or Point Of Sale (POS), at least a shelf, at least a trolley, and a back office.

The entrance may be an area of the store, in which customers generally enter the store, and the exit may be an area of the store, in which customers generally leave the store. The entrance and the exit may be separated by a separation, for example, a separation wall. Before the exit, a checkout may be provided in the store. A plurality of shelves may be arranged in the store. The shelves may be, for example, a rack or storage for inventory, for example, food, for example, fruits, vegetables, bakery, meat or cheese. However, any other kind of inventory may be used instead.

The system may further include a checkout. At the checkout no influence through the customer may be possible. At the checkout a communication between the weighing device and the processor may be provided.

The checkout may be provided as an area where no influence through the customer may be possible. In other words, the customer may push a trolley in a position in the checkout after having finished shopping, and the trolley may not be accessible by the customer until final payment may be done by the customer.

The system may further be configured to provide at the entrance a weighing device for weighing of the trolley and/or a customer.

A weighing device may be positioned in a floor or ground of the store. The weighing device may be configured to capture a weight of a trolley and to capture a weight of the customer separately. The weighing device may be configured to capture a weight of a trolley and a weight of the customer at the same time.

The back office further includes a server and/or a cloud storage.

The server and/or the cloud system may include a plurality of memory slots. Data or data sets received by a processor may be stored in the respective memory slot of the plurality of memory slots. The memory may include or store a plurality of data, e.g. a plurality of data sets. The data may be generated by removing of inventory from at least a weighing device of a plurality of weighing devices which may be positioned on a respective shelf of a plurality of shelves. The data or data sets may be transmitted by at least a communication device.

The system may determine or set a predetermined period of time, for example in a range of 1 second to 300 seconds, e.g. 60 seconds, after the system may detect a weight change at a weighing device of a shelf. The period of time may be a predetermined tolerance value. By way of example, the period of time may be generated using a processor.

The period of time may be combined with at least a logical query of any similar weighted event on at least another shelf of a plurality of shelves.

Statistic data may be used to allocate at least a data set received from a shelf to a data set received afterwards from a trolley in a memory of a back office. A processor may be configured to allocate at least a data set received from a shelf (e.g., weight difference, current time, and shelf identification code) to a data set (e.g., weight difference, current time) received afterwards from a trolley in a memory of a back office.

At least a cashier may be available in a retail store to provide support to the automated procedures in the store, e.g. by refilling shelves with inventory.

A method for managing inventory may be provided. The method may include: determining a weight change using at least a weighing device, determining at least data relating to at least the weight change and an current time, transmitting the data from at least the weighing device to a processor at that moment of weight change may be detected, and storing the transmitted data in at least a memory using the processor.

Transmitting the data from at least the weighing device to the processor may be performed in moment of value may be changing or mass difference or weight difference may be detected by a weighing device.

Determining data relating to a weight change may include calculating a weight difference between a weight before interaction of the customer and a weight after interaction of the customer. Calculating a weight difference may include subtracting a detected second weight after removing at least an inventory from a weighing device from a detected first weight before a removing at least an inventory from a weighing device, and calculating and providing a weight difference value using a processor.

Transmitting data from at least the weighing device to the processor may be performed using a wireless communication, for example, Infrared (IR), Near Field Communication (NFC), cellular, satellite, Bluetooth, WiFi etc., or other connection technologies.

Determining at least data relating to a current time may include taking over a current time format from, for example, a computer clock.

Determining at least data relating to at least the weight change and a current time may further include combining data relating to the weight change and data relating to the current time to a data set.

The method may further include a removing of a data set from a memory in a back office using a processor, in case a customer has returned an inventory back on a weighing device after the customer has removed an inventory from a corresponding weighing device. In other words, the customer may have removed an inventory from a weighing device, and the processor may have stored a first data set comprising the respective weight difference and a corresponding timestamp in a memory, and afterwards, the customer may have put the inventory back on the weighing device. The processor may have deleted the respective data set from a memory. In other words, the processor may be configured to detect, in case a customer may remove an inventory and puts back again the inventory to a weighing device.

The method may further include: detecting a weight change using a weighing device in a trolley, storing data relating to the weight change and a current time at that moment of weight change may be detected using at least a processor.

Detecting a weight change may include comparing a weight after an inventory may be added to the weighing device to a weight before the inventory may be added to the weighing device.

After detecting a weight change at a weighing device of a shelf, a predetermined period of time, for example in a range of 1 second to 300 seconds, e.g. 60 seconds, may be generated. The period of time may be a predetermined tolerance value. By way of example, the period of time may be generated using a processor.

The period of time may be combined with at least a logical query of any similar weighted event on at least another shelf of a plurality of shelves. Statistic data may be used using a processor to allocate in a memory of a back office at least a data set received from a shelf to a data set received afterwards from a trolley.

A weight change at a weighing device of a shelf may be determined before a weight change may be determined at a weighing device in a trolley.

Detecting may further include generating a data set or removing a data set from a memory using a processor.

The memory may be a memory of a weighing device or a memory of a communication device or a memory of a processor or a memory of a back office or a memory of an external server.

The processor may be a processor of a weighing device or a processor of a communication device or a processor of a back office or a processor of an external server.

The storing may further include storing the data to a memory cell a memory using the processor.

The storing may further include storing the data in a memory cell of a plurality of memory cells using the processor.

The storing may further include generating a virtual basket in a memory, for example, of a back office or computer in a back office. In other words, the data in the memory may represent the total amount of inventories which may have been removed from the weighing devices.

The method may further include: positioning a trolley in a point of checkout where no influence through a customer may be provided, establishing a communication between the trolley and a processor, transmitting the stored data relating to at least a determined weight change and at least a corresponding timestamp to the processor, verifying the data to logs from weighing devices, generating a digital basket using the processor, sending a complete bill to the customer, paying of the bill by the customer, after successfully paying the bill, releasing the trolley from the checkout.

The method may further includes determining a position of the trolley in the checkout.

The method may further include closing down an area in which the trolley may be positioned. Closing down an area may include locking a door of a cage, in which the trolley may be positioned.

The method may further include starting a communication between a communication device of a trolley and a processor of a back office after determining the position of the trolley in the checkout and/or determining that, for example, a door may be closed.

The method may further include: weighing the trolley using a weighing device in the floor at the checkout where no influence through the customer may be provided.

The method may further include comparing of data sent from at least a trolley to a back office with at least a data set in the back office.

A comparison of at least a data set received by a shelf and at least a data set received by a trolley may be provided using determined statistic data.

Determined statistic data may be generated using known events and procedures, e.g. known period of times between a detection of a weight change on a weighing device of a shelf and a detection of a weighing change on a weighing device of a trolley.

The system may be configured to store past managing procedures of inventory and to generate statistic data from the past managing procedures.

A time spent for shopping can be minimized. A store-architecture may be provided which allows autonomous shopping using weighing devices in shelves, in scales for fresh foods, and in the field of point of sale areas as well as in trolleys. A shopping process or a picking process using a picker in logistic centers may be accelerated and a customer satisfaction may be increased.

Due to the exact measurement of a weight difference, a precise information may be given how much inventory was sold and how much of each inventory has to be refilled, for example, in shelves.

An amount of radio communication, for example, of wireless radio communication in retail stores may be minimized. A radio communication may be used at a time directly before a payment process at a point of sale area.

It may be achieved by the device for measuring forces and a weighing device to change a currently available Point Of Sale (POS) in a way that a manual capturing of inventory by a cashier may be omitted. A high level of automation may be achieved. The capturing of inventory, for example, food may be provided by determining or measuring a change in weight, for example, in a shopping trolley or on shelves. An inventory, for example, in a supermarket, may be available at all times. Further, the content of a shopping trolley may be available at all times. The device may be standardized and versatile as it may be used for measuring forces, for example, in shopping trolleys, in scales, and in shelves. A casing of the device may be configured such, that it may accommodate the sensor in at least two different ways. The device for measuring a force may be used modular in a plurality of weighing devices, independent from the type of weighing device. The device for measuring forces may have a simple construction with a minimum number of components. There may be no need of prefabricated food, for example, prefabricated vegetables and fruits, which means, that food may be weighed by the device without packaging. The user or customer, for example, a client in a supermarket, must not have any concern that a weight of an object also may incorporate the weight of the packaging of a prefabricated food. Therefore, the user may benefit from using of the device for measuring forces. Using a plurality of devices for measuring forces a total measuring range may be divided in at least two partial measuring ranges. Each partial measuring range may be coved by at least one device for measuring forces of the plurality of devices for measuring forces with high accuracy. Due to a specific arrangement of a plurality of devices for measuring forces, it may be provided that each device for measuring forces may be operated in an optimal device sensing range, and a high accuracy of measurement of forces may be achieved. The customer of the sensor in at least different positions in the casing allows an optimization of a sensor measurement range of the sensor. Thus, an optimization of the sensor accuracy may be achieved. By measuring the change of weight in a shopping trolley, it may be identifiable, which inventory or products a customer has or a plurality of customers have added in the basket of their shopping trolley. Due to the optimized mechanical characteristics of the device for measuring forces, the device may be installed in shelves, scales and weighing devices for fresh products. Only one standardized device for measuring forces or casing may be used to accommodate a sensor at different positions in the casing, and thereby modularity may be increased.

In the drawings, like reference characters generally refer to the same parts throughout the different views. The use of the same reference numbers in different figures indicates similar or identical items or features. The drawings are not necessarily to scale, emphasis instead generally being placed upon illustrating the principles of the invention. In the following description, various embodiments of the invention are described with reference to the following drawings, in which:

FIGS. 4A to 4D show a first example of a device for measuring forces in schematic views, in accordance with various embodiments, wherein FIG. 4B is a cross-section taken through section lines A-A in FIG. 4A;

FIG. 5A to 5D show a second example of a device for measuring forces in schematic views, in accordance with various embodiments, wherein FIG. 5B is a cross-section taken through section lines A-A in FIG. 5A and FIG. 5D is a cross-section taken through section lines B-B in FIG. 5C;

FIGS. 6A to 6C show a force input device in schematic views, in accordance with various embodiments, wherein FIG. 6C is a cross-section taken through section lines A-A in FIG. 6A;

FIGS. 8A to 8D show a casing in schematic views, in accordance with various embodiments, wherein FIG. 8C is a cross-section taken through section lines A-A in FIG. 8A;

FIGS. 9A to 9D show a support panel in schematic views, in accordance with various embodiments, wherein FIG. 9D is a cross-section taken through section lines A-A in FIG. 9A;

FIGS. 10A to 10E show a weighing device for weighing of objects in schematic views, in accordance with various embodiments, wherein FIG. 10D is a cross-section taken through section lines B-B in FIG. 10A and FIG. 10E is a cross-section taken through section lines A-A in FIG. 10A.

Figure 1:
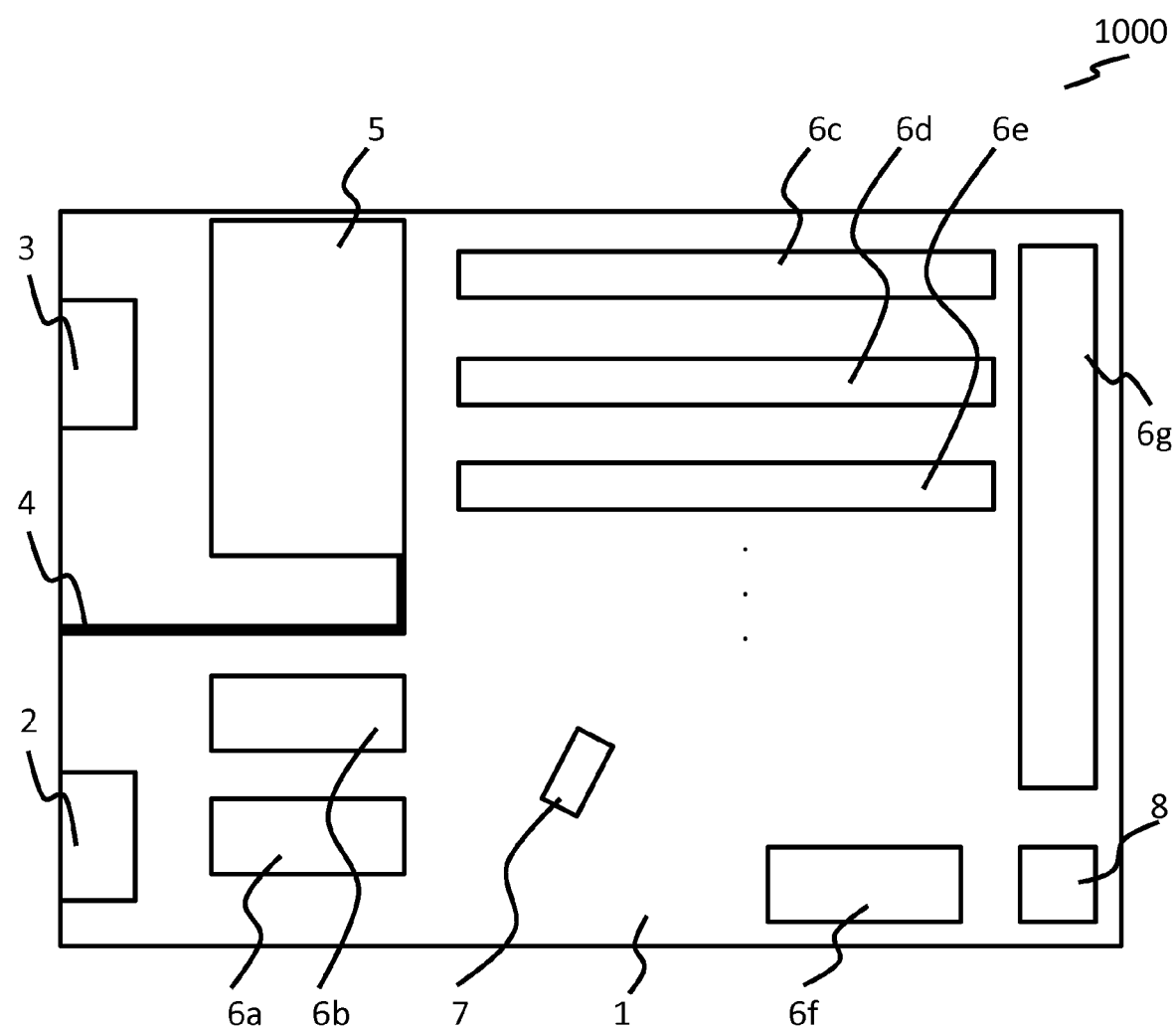
FIG. 1 shows a system for managing inventory in schematic views, in accordance with various embodiments.

The skilled in the art will recognize that the examples are not limited to the examples or drawings described. It should be understood that the drawings and detailed description thereto are not intended to limit examples to the particular form disclosed, but on the contrary, the intention is to cover all modifications, equivalents and alternatives falling within the spirit and scope as defined by the appended claims. As used throughout this application, the word "may" is used in a permissive sense (i.e., meaning having the potential to), rather than the mandatory sense (i.e., meaning must).

Further, each element of a list comprising a plurality of elements is also to be considered to be disclosed in combination with any further element of a further list.

The following detailed description refers to the accompanying drawings that show, by way of illustration, specific details and examples in which the invention may be practiced. These examples are described in sufficient detail to enable those skilled in the art to practice the invention. Other examples may be utilized and structural, logical, and electrical changes may be made without departing from the scope of the invention. The various examples are not necessarily mutually exclusive, as some examples can be combined with one or more other examples to form new examples. Various examples are described in connection with methods and various examples are described in connection with devices. However, it may be understood that examples described in connection with methods may similarly apply to the devices, and vice versa.

The terms "at least one" and "one or more" may be understood to include any integer number greater than or equal to one, i.e. one, two, three, four, [ . . . ], etc. The term "a plurality" may be understood to include any integer number greater than or equal to two, i.e. two, three, four, five, [ . . . ], etc.

The phrase "at least one of" with regard to a group of elements (for example at least one of A and B, or in the same way, at least one of A or B) may be used herein to mean at least one element from the group consisting of the elements, i.e. the logical and/or. For example, the phrase "at least one of" with regard to a group of elements may be used herein to mean a selection of: one of the listed elements, a plurality of one of the listed elements, a plurality of individual listed elements, or a plurality of a multiple of listed elements.

The term "coupled" is used herein to mean, for example, communicatively coupled, which may include type of a direct connection or an indirect connection. This may include any suitable wired connection and/or wireless connection.

A "circuit" as used herein is understood as any kind of logic-implementing entity, which may include special-purpose hardware or a processor executing software. A circuit may thus be an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a "circuit". It is understood that any two (or more) of the circuits detailed herein may be implemented as a single circuit with substantially equivalent functionality, and conversely that any single circuit detailed herein may be implemented as two (or more) separate circuits with substantially equivalent functionality. Additionally, references to a "circuit" may refer to two or more circuits that collectively form a single circuit. The term "circuit arrangement" may refer to a single circuit, a collection of circuits, and/or an electronic device composed of one or more circuits.

A "processor" (or equivalently "processing circuitry" or "processing circuit") as used herein is understood as referring to any circuit that performs an operation(s) on signal(s), such as, for example, any circuit that performs processing on an electrical signal or an optical signal. A processing circuit may thus refer to any analog or digital circuitry that alters a characteristic or property of an electrical or optical signal, which may include analog and/or digital data. A processing circuit may thus refer to an analog circuit (explicitly referred to as "analog processing circuit(ry)"), digital circuit (explicitly referred to as "digital processing circuit(ry)"), logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Accordingly, a processing circuit may refer to a circuit that performs processing on an electrical or optical signal as hardware or as software, such as software executed on hardware (for example a processor or microprocessor). As utilized herein, "digital processing circuit(ry)" may refer to a circuit implemented using digital logic that performs processing on a signal, for example, an electrical or optical signal, which may include logic circuit(s), processor(s), scalar processor(s), vector processor(s), microprocessor(s), controller(s), microcontroller(s), Central Processing Unit(s) (CPU), Graphics Processing Unit(s) (GPU), Digital Signal Processor(s) (DSP), Field Programmable Gate Array(s) (FPGA), integrated circuit(s), Application Specific Integrated Circuit(s) (ASIC), or any combination thereof. Furthermore, it is understood that a single a processing circuit may be equivalently split into two separate processing circuits, and conversely that two separate processing circuits may be combined into a single equivalent processing circuit.

A "sensor" as used herein is understood as referring to any kind of device, module, or subsystem whose purpose may be to detect events or changes in its environment and send the information to other electronics, which, for example, may be a processor or a computer.

A "force input device" as used herein is understood as referring to any kind of object, which allows deformation in case an influence, for example, a force or load from external is impinged in the force input device.

A "casing" as used herein is understood as referring to any kind of object, which allows carrying or accommodating other components. Moreover, a casing as used herein is understood as referring to an object which is arranged or positioned between other subjects.

A "support panel" as used herein is understood as referring to any kind of surface, on which objects may be deposited, for example, food and non-food products.

A "u-turned portion" as used herein is understood as referring to any kind of portion, which includes a U-shape in case viewed from a side or a sectional view.

As used herein, the term "memory" may refer to any device or combination of devices which are capable of storing, accessing and retrieving data, which may include any combination and number of data servers, databases, data storage devices, data storage media, and cloud-systems in any standard, distributed or clustered environment.

As used herein, the term "cloud" may refer to any information technology paradigm which may enable ubiquitous access to shared pools of configurable system resources and higher-level services which can be rapidly provisioned with little management effort, especially over the internet. Herein, cloud or cloud computing may rely on sharing of resources to achieve coherence and economies of scale, similar to a public utility.

Figure 2:
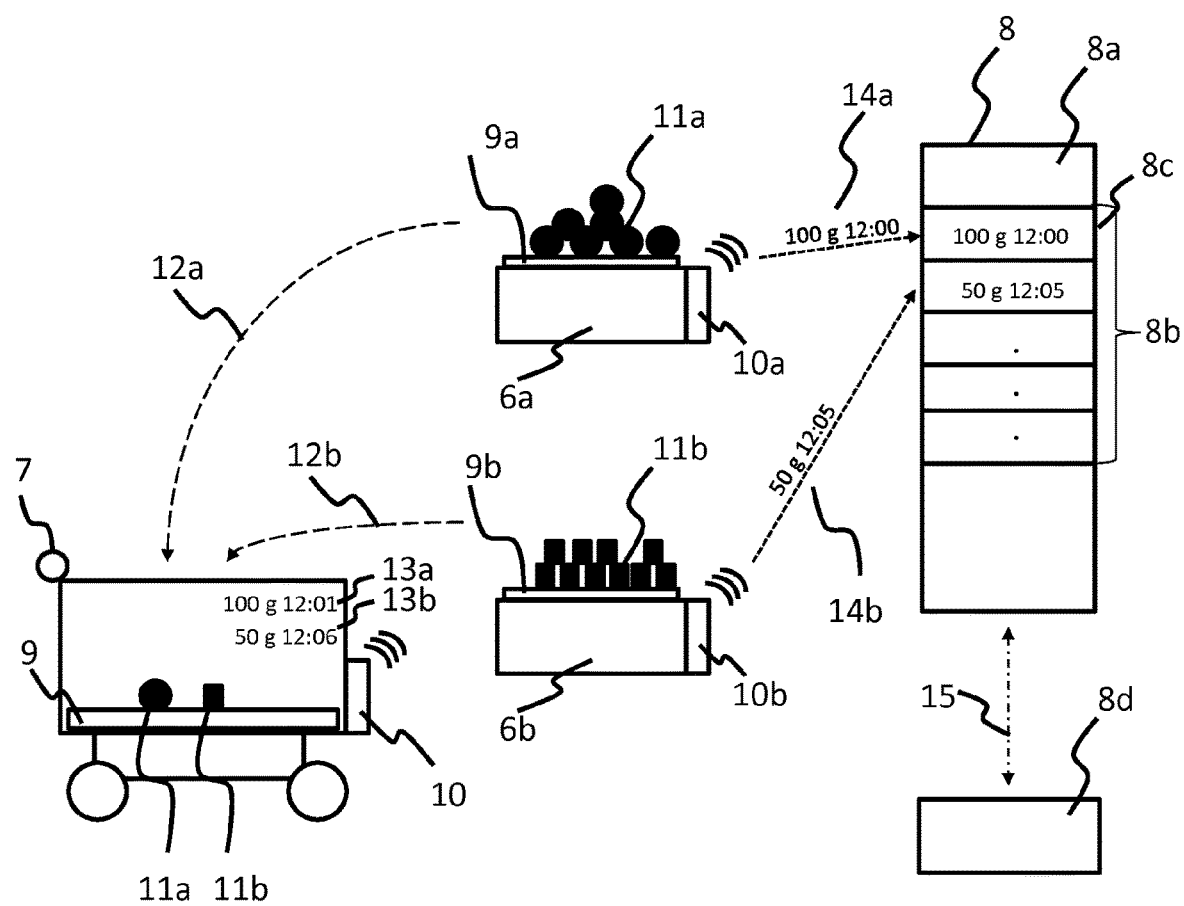
FIG. 2 shows a system for managing inventory in schematic views, in accordance with various embodiments.

FIG. 1 and FIG. 2 show systems for managing inventory in a schematic view, in accordance with various embodiments.

In various embodiments, a system 1000 may include a store 1 as schematically illustrated in FIG. 1.

FIG. 2 shows a system for managing inventory in a schematic view in accordance with various embodiments.

The store 1 may be a general retail store. In various embodiments, the store 1 may be a warehouse. In various embodiments, the store 1 may be a supermarket. In various embodiments, the store 1 may be a shop. In various embodiments, the store 1 may be a bakery. In various embodiments, the store 1 may be a butcher shop. In various embodiments, the store 1 may be a logistic center. However, any other kind of store may be provided instead.

The store 1 may include at least an entrance 2, an exit 3, a separation 4, a checkout 5 or Point Of Sale (POS), at least a shelf 6a-6g, at least a trolley 7, and a back office 8, as schematically illustrated in FIG. 1.

The entrance 2 may be an area of the store 1, in which customers generally enter the store 1 and the exit 3 may be an area of the store 1, in which customers generally exit the store 1. The entrance 2 and the exit 3 may be separated by a separation 4, for example, a separation wall. Before the exit 3 a checkout 5 may be provided in the store 1. A plurality of shelves 6a-6g may be arranged in the store 1. The shelves 6a-6g may be, for example, a rack or storage for inventory, for example, food, for example, fruits, vegetables, bakery, meat and cheese. However, any other kind of inventory may be provided instead.

The back office 8 may include at least a processor 8a and/or a memory, as schematically illustrated in FIG. 2.

The back office 8 may include at least a processor 8a, at least a data set 8c, and at least a memory 8b. The back office 8 may include a server 8d or a cloud system or may be coupled to a server 8d or cloud system via a connection 15, which may be wireline and/or wireless. A wireline communication may use wired technologies, for example, wires, Universal Serial Bus (USB), fiber optic cable, etc., and a wireless communication may use wireless technologies, for example, Radio Frequency (RF), Infrared (IR), Near Field Communication (NFC), cellular, satellite, Bluetooth, WiFi etc., or other connection technologies.

In various embodiments, the checkout 5 may be provided as an area where no influence through the customer may be possible. In other words, the customer may push a trolley 7 in a position in the checkout 5 after having shopped, and the trolley 5 may not be accessible anymore for the customer until final payment may be done by the customer.

A shelf 6a, 6b may include at least a weighing device 9a, 9b, as schematically illustrated in FIG. 2. A trolley 7 may include at least a weighing device 9. The weighing device 9 may be positioned in the trolley 7 such that inventory 11a, 11b may be put in the basket of the trolley 7. The inventory 11a, 11b may be weighed by the weighing device 9. Further, a weighing device 9a, 9b may be positioned in at least a shelf 6a, 6b such that inventory 11a, 11b may be put on the respective shelf 6a, 6b, and may be weighed by respective weighing device 9a, 9b.

The trolley 7 may include a communication device 10. Further the shelf 6a, 6g may include a communication device 10a, 10b. Communication device 10, 10a, 10b may be configured to provide a wireless communication or wireless technologies, for example, Radio Frequency (RF), Infrared (IR), Near Field Communication (NFC), cellular, satellite, Bluetooth, WiFi etc., or other connection technologies.

The weighing device 9, 9a, 9b may use at least an inductive sensors, a capacitive sensor, strain gauges, force meter, acceleration measurement or other force measuring devices.

Weighing devices 9, 9a, and 9b may include at least a strain gauge which may take advantage of the physical property of electrical conductance and its dependence on the conductor's geometry. By way of example, in case an electrical conductor, coupled to an elastic portion of the weighing device, may be stretched within the limits of its elasticity such that it may not break or permanently deform, it may become narrower and longer, and it may increase its electrical resistance end-to-end, which may be detected using an electric circuit. Conversely, in case an electrical conductor, coupled to an elastic portion of the weighing device, may be compressed such that it does not buckle, it will broaden and shorten, and it may decrease its electrical resistance end-to-end, which may be detected using an electric circuit. From the measured electrical resistance of the strain gauge, the amount of induced stress may be inferred.

The weighing device 9, 9a, 9b may include at least a support panel allowing to put inventory on it, a plurality of sensors allowing to measure forces applied to the support panel by the inventory.

As schematically shown in FIG. 2, a customer may enter a physical store, for example, a shopping area as schematically illustrated in FIG. 1, and may take or use trolley 7 which may include a weighing device 9. In the physical store, a variety of inventor 11a, 11b, for example, vegetables, meat, fruit etc., may be positioned on the shelves 6a, 6b, and may be accessible to the customer. The shelf 6a may include at least a weighing device 9a, and the shelf 6b may include at least a weighing device 9b. In FIG. 2, inventory 11a may be a round object, for example, an apple, and may have a first weight, and inventory 11b may have a rectangular object, for example, a can or box, having a second weight.

While a shopping tour in the shopping area, a customer may decide to buy a piece of inventory 11a and a piece of inventory 11b (see reference signs 12a and 12b in FIG. 2). The customer may remove one piece of inventory 11a from a weighing device 9a and may put the inventory 11a on the weighing device 9 in the basket of his trolley 7. Further, the customer may remove one piece of inventory 11b from a weighing device 9b and may put the inventory 11b on the weighing device 9 in the basket of his trolley 7. Thus, the inventory 11a and 11b may be positioned on the weighing device 9.

At least one processor may be configured to generate data including at least a weighing difference at the moment the customer removes inventory 11a from the weighing device 9a of shelf 6a. The weighing difference may be a difference of weight determined before the customer removes an inventory 11a from the shelf 6a and after the customer has removed the inventory 11a from the shelf 6a. The difference of weight may be determined by subtracting a mass after the customer has removed an inventory 11a from the shelf 6a from a mass before the customer has removed an inventory 11a from the shelf 6a. The generated data 14a may further include a timestamp, for example, the current time, as schematically illustrated in FIG. 2. By way of example, the data 14a may be a data set including a data of a weight difference of 100 g and a timestamp of 12:00. In other words, it may be stored that a customer bought 100 g of inventory 11a at a time of 12:00. The data 14a may be generated after a predetermined time the weight difference may be detected or measured by the weighing device 9a. The data 14a may be generated approximately after the weight difference may be detected. Using the processor and the communication device 10a, the data 14a or data package or data set may be transmitted to a back office 8. The data 14a may be or include a data set having a data of weight difference, a timestamp, and a shelf identification code. By way of example, a weight difference, a timestamp, and a shelf identification code of shelf 6a may be transmitted from shelf 6a to the back office 8 using the communication device 10a. By way of example, a weight difference, a timestamp, and a shelf identification code of shelf 6b may be transmitted from shelf 6b to the back office 8 using the communication device 10b. The shelf identification code may be a number, which may be allocated to each single shelf 9a, 9b. By way of example, shelf 6a may include the code 1. By way of example, the shelf 6b may include the code 2. A change of quantity may be determined using the weight difference, to determine the amount of units of inventory. By way of example, an amount of inventory removed by a customer may be calculated by dividing a total weight difference by a given weight of a corresponding single inventory. The amount of units of inventory may afterwards be multiplied by a respective price of an inventory and may be stored in the memory 8b. The data 14b may be generated after a predetermined time the weight difference may be detected or measured by the weighing device 9b. The data 14b may be generated approximately after the weight difference may be detected. Using the processor and the communication device 10b, the data 14b or data package or data set may be transmitted to a back office 8.

In case the customer decides not to buy an inventory 11a or 11b, the customer may put back the respective inventory 11a or 11b from the weighing device 9 in the trolley 7 on the weighing device 9a of shelf 6a or on the weighing device 9b of shelf 6b, which may be registered by the weighing devices 9a and 9b. The processor may be configured to detect a weight difference, for example, a weight increase, in the shelf 6a or 6b, and the communication device 10a or 10b may transmit a data set 14a or 14b to the back office 8. The processor 8a may be configured to delete the data set 8c which corresponds to the weight difference put back on the weight device 9a or 9b and may delete the corresponding data set 8c in the memory 8b the back office 8.

The back office 8 may include a processor 8a and a memory 8b. By way of example, the processor 8a may be implemented as a personal computer. The processor 8a in the back office 8 may be configured to store the data 14a in the memory 8b of the back office 8 as a data set 8c, as schematically illustrated in FIG. 2. A first data set 8c may, for example, include the data 100g and 12:00.

As described in view of shelf 6a, weighing device 9a, communication module 10a, and inventory 11a, a shopping procedure by the customer in view of shelf 6b, weighing device 9b, communication device 10b, and inventory 11b may be performed in the same manner. At least one processor may be configured to generate data including at least a weighing difference at the moment the customer may remove inventory 11b from the weighing device 9b of shelf 6b. A weighing difference may be a difference of weight determined before the customer removes an inventory 11b from the shelf 6b and after the customer has removed the inventory 11b from the shelf 6b. A difference of weight may be determined by subtracting a mass after the customer has removed an inventory 11b from the shelf 6b from a mass before the customer has removed an inventory 11b from the shelf 6b. The generated data 14b may further include a timestamp, for example, the current time, as schematically illustrated in FIG. 2. By way of example, the data 14b may be a data set including the data 50g and the timestamp 12:05. In other words, it may be stored that a customer bought 50 g of inventory 11b at a time of 12:05. The data 14b may be generated after a predetermined time the weight difference may be detected or measured by the weighing device 9b. The data 14b may be generated approximately after the weight difference may be detected. Using the processor and the communication device 10b, the data 14b or data package or data set may be transmitted to a back office 8. The processor 8a in the back office 8 may be configured to store the data 14b in the memory 8b of the back office 8 as data set 8c, as schematically illustrated in FIG. 2. A second data set 8c may, for example, include the data 50g and 12:05.

The methods described in relation to weighing device 6a and 6b may also be provided for further weighing devices. A plurality of data sets 8c in the memory 8b may be generated. Further, in case a plurality of customers may be in the store 1, the procedures described above may be performed for each customer.

In various embodiments, after the customer has removed a inventory 11a from the weighing device 9a of shelf 6a, and has put the inventory 11a on the weighing device 9 in the basket of his trolley 7 (reference sign 12b in FIG. 2), and/or after the customer has removed a inventory 11b from the weighing device 9b of shelf 6b, and has put the inventory 11b on the weighing device 9 in the basket of his trolley 7 (reference sign 12b in FIG. 2), the at least one processor (not shown in FIG. 2) may determine a weigh difference between the mass on the weighing device 9 before the customer has put inventory 11a and 11b on the weighing device 9 and a mass after the customer has put inventory 11a and 11b on the weighing device 9. The weighing device 9 may include a processor and/or the memory. The communication device 10 may include a processor and/or the memory. The processor may be configured to generate data 13a and 13b. The data 13a, 13b may include at least a weighing difference. Further, the data 13a, 13b may include at least a timestamp, for example, the current time. Using a quartz, a current time and a date specification may be generated, and may be added to the weight difference by a processor to obtain a data set. By way of example, the data 13a may include weight difference 100g and time 12:01. For example, the data 13b may include weight difference 50g and time 12:06. The processor may be configured to store the data 13a, 13b in a memory (not shown in FIG. 2).

The communication device 10 only communicated the data 14c in case the trolley 7 may be positioned in the checkout 5. Therefore, an amount of wireless communication between the communication device 10 and the back office 8 may be low.

Figure 3:
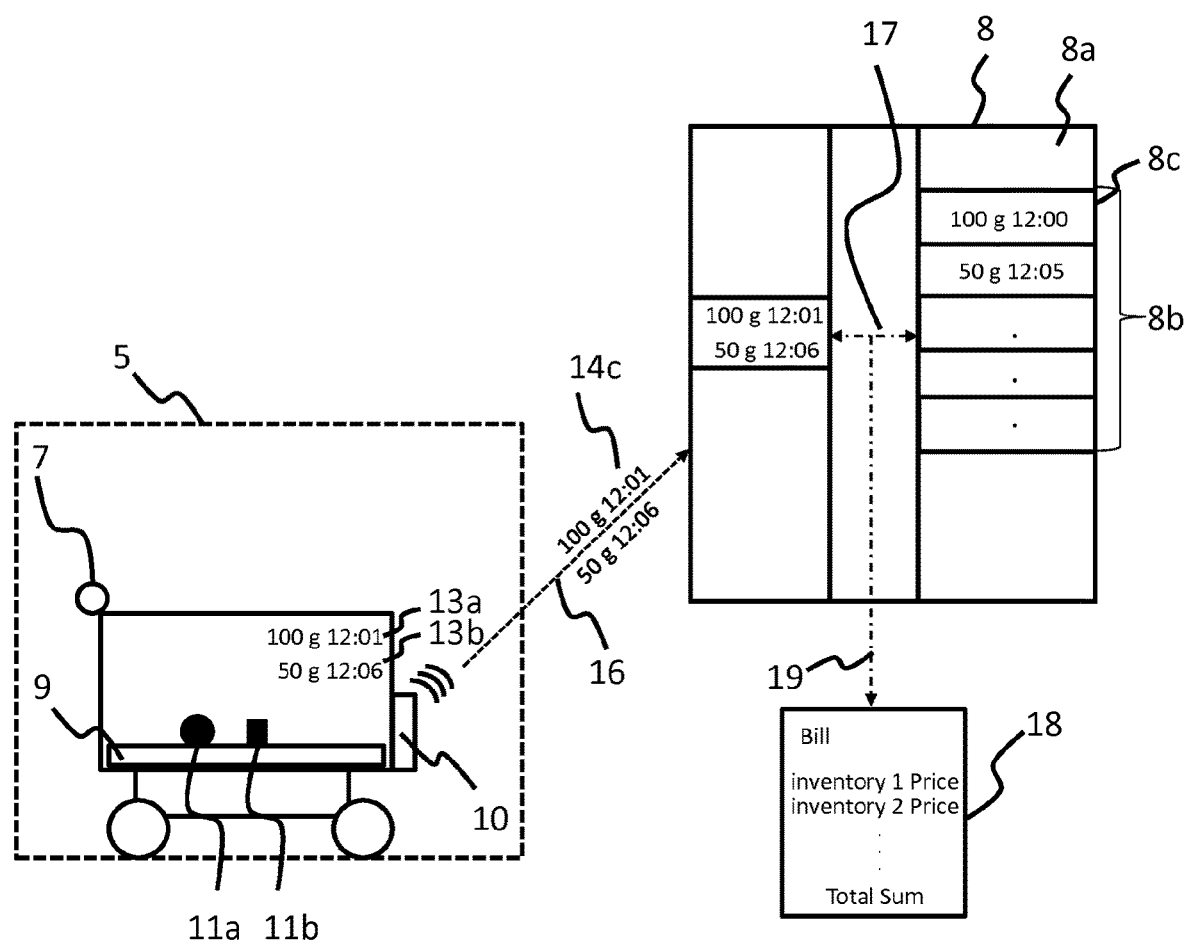
FIG. 3 shows a system for managing inventory in schematic views, in accordance with various embodiments.

FIG. 3 shows a system for managing inventory in schematic views in accordance with various embodiments.

The trolley 7 in FIG. 3 may be at the checkout 5 in the store 1. This may be the case, for example, in case the customer has finished shopping. In the checkout 5 the trolley 7 may be parked in a gate or a closed room. In the checkout 5, the customer may not be allowed to remove or to add inventory 11a, 11b from or to the trolley 7. All inventories 11a, 11b, which the customer decides to buy, may be in the trolley 7.

In the checkout 5 the communication device 10 may transmit stored data 13a, 13b using a communication 16 using a processor. The data 14c may include a data set, for example, weigh difference 100g and time 12:01, and weight difference 50g and 12:06, and may be transmitted to the back office 8. The data 14c may be stored, for example, using the processor 8a, for example, in the memory 8b. To start a data communication between the trolley 7 and the back office 8, the trolley 7 may be configured to wait for a wake up signal from the back office 8 or by the processor 8a in the back office 8. In case the trolley 7 receives a wake up signal by the back office 8 or processor 8a, the trolley 7 may be configured to transmit stores data or data sets 13a, 13b to the back office 8. A data traffic may be at a low level while shopping and may only increase at the checkout 5.

A comparison 17 between the data 14c and a data set 8c in the memory 8b may be performed. The comparison 17 may include loading each data set 8c from the memory 8b and performing a comparison 17 with each data set, which may be included in the transmitted data 14c in the checkout 5.

In various embodiments, in case a matching between a loaded data set 8c and a data set of the data 14c may be provided, the data set 8c may be allocated to the trolley 7 actually positioned in the checkout 5. After a matching of all data sets 8c to corresponding data sets of the data 14c, the comparison 17 may be completed.

Based on the comparison 17 a bill 18 may be generated for each customer. The bill 18 may list the inventories 11a, 11b bought by the customer and a total sum. The bill 18 may be transmitted using an output 19 to the customer, for example, on a display device, for example, a screen, or on a tablet or smartphone.

In various embodiments, the customer may pay the bill 18 using a self-service machine or may pay the bill 18 as registered customer of the respective store 1.

FIG. 4A to FIG. 4D show a first example of a device 100a for measuring forces in schematic views in accordance with various embodiments.

FIG. 4A shows a bottom view of the device 100a for measuring forces in a schematic view in accordance with various embodiments. FIG. 4B shows a sectional view of the device 100a in a schematic view in accordance with various embodiments. FIG. 4C shows a side view of the device 100a in a schematic view in accordance with various embodiments. FIG. 4D shows a top view of the device 100a in a schematic view in accordance with various embodiments.

In various embodiments, the device 100a may include a sensor 102, a force input device 104, and a casing 106. In various embodiments, the sensor 102 may be enclosed only partially by the casing 106, as schematically illustrated in FIG. 4A to FIG. 4D. In other words, at least a portion of the sensor 102 incorporating, for example, at least a coil, may protrude from the casing 106. The sensor 102 and a force input device 104 may be coupled to the casing 106 using, for example, glue, for example, Cyanoacrylate (CA), for example, Loctite 401 or Loctite 406. As schematically illustrated in FIG. 4B, the sensor 102 may be arranged parallel to the force input device 104 and parallel to a top and bottom surface of the casing. The sensor 102 may include a plate shape. The force input device 104 may be firmly attached to the casing 106 and may be configured to absorb a force. The sensor 102 and/or the force input device 104 may be clamped to the casing 106. The device 100a schematically illustrated in FIG. 4A to FIG. 4D may be aligned in operation such that a portion of the device 100a having the force input device 104 may be aligned upwards, while an opposite portion of the casing 106 may be aligned downwards, and the force input device 104 may be aligned parallel to the horizontal.

In the following, various modifications and/or additional features may be described for the device 100a described above with reference to FIGS. 4A to 4D.

FIG. 5A to 5D show a second example of a device 100b for measuring forces in schematic views in accordance with various embodiments.

Figure 5A:
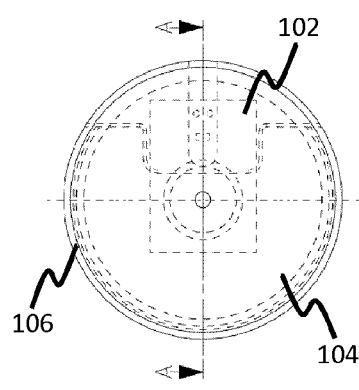
Figure 5B:
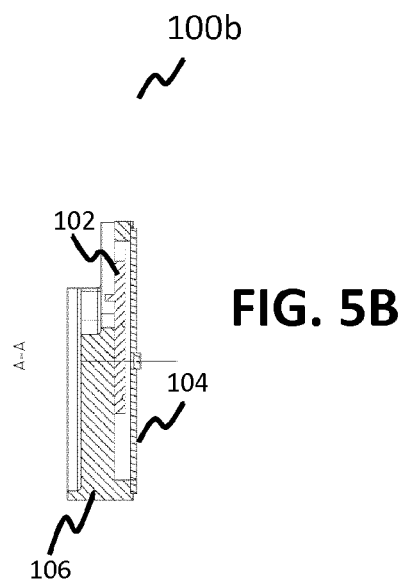
Figure 5C:
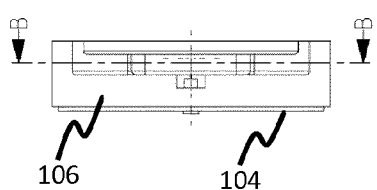
Figure 5D:
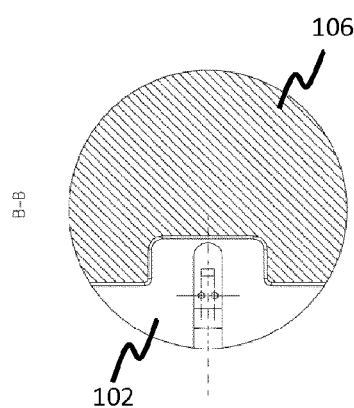

FIG. 5A shows a bottom view of the device 100b for measuring forces in a schematic view, in accordance with various embodiments. FIG. 5B shows a sectional view of the device 100b for measuring forces in a schematic view, in accordance with various embodiments. FIG. 5C shows a side view of the device 100b for measuring forces in a schematic view in accordance with various embodiments. FIG. 5D shows a top view of the device 100b for measuring forces in a schematic view, in accordance with various embodiments.

The device 100b may include a sensor 102, a force input device 104, and a casing 106. The sensor 102 may be fully integrated or enclosed by the casing 106, as illustrated in FIG. 5A to FIG. 5D. In other words, the sensor 102 may be provided not to protrude from the casing in case viewed from a top view as illustrated, for example, in FIG. 5D or a side view as illustrated, for example, in FIG. 5B. As schematically illustrated in FIG. 5A, the sensor 102 may be fully integrated in the casing 106, in case viewed in a top or bottom view, or in case viewed in a side view. The sensor 102 may at least include a coil. The coil may be concentrically aligned with the circular cylindrical shaped casing 106. The sensor 102 and the force input device 104 may be aligned parallel to outer surfaces of the casing 106, as schematically illustrated in FIG. 5B. In various embodiments, the device 100b may be aligned in operation such that a portion of the device 100b having the force input device 104 may be aligned downwards, while an opposite portion of the casing 106 may be aligned upwards. The force input device 104 may be aligned parallel to the horizontal.

As show in FIG. 4B, the sensor 102 of the first device 100a of the plurality of devices for measuring forces extends beyond an edge (referenced by D3 in FIG. 8C) of the casing 106 of the first device 100a. As shown in FIG. 5B, the sensor 102 of the second device 100b of the plurality of devices for measuring forces is positioned within the edge of the casing 106 of the second device 100b.

In the following, various modifications and/or additional features may be described for the device 100b described above with reference to FIG. 5A to FIG. 5D.

Figure 6A:
Figure 6B:
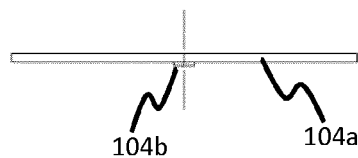
Figure 6C:
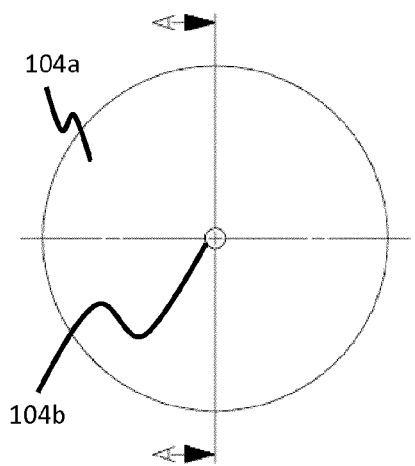
Figure 6C:
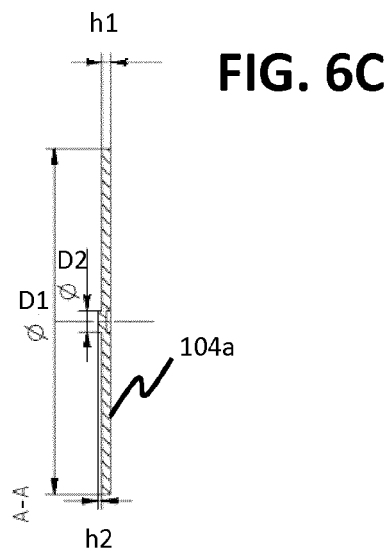

FIG. 6A to FIG. 6C show a force input device 104 in schematic views, in accordance with various embodiments.

The force input device 104 may be used as force input device 104 in the devices 100a and 100b described in view of FIG. 4A to FIG. 4D and FIG. 5A to FIG. 5D. The force input device 104 may include a first portion 104a and a second portion 104b. The first portion 104a may have a disc-shape or flat cylindrical shape. The second portion 104b may have a disc-shape or a flat cylindrical shape. The first portion 104a and the second portion 104b may be concentrically aligned. A first surface of the first portion 104a may be in contact with or coupled to a first surface of the second portion 104b. The first portion 104a and the second portion 104b may be manufactured in one piece, as schematically illustrated in FIG. 6C. The first portion 104a may, for example, have a diameter D1 in a range of about 35 mm to 45 mm, e.g. of about 40 mm. The second portion 104b may be implemented as cam or protrusion and may, for example, have a diameter D2 in a range of about 2 mm to 3 mm, e.g. of about 2.4 mm. The first portion 104a may have a height h1 in a range of about 0.5 mm to 1.5 mm, e.g. of about 1 mm. The second portion 104b may have a height h2 in a range of about 0.3 mm to 0.8 mm, e.g. of about 0.5 mm.

The first portion 104a and the second portion 104b may be separate entities. The first portion 104a and the second portion 104b may be connected using glue, for example, Cyanoacrylate, for example, Loctite 401 or Loctite 406. The first portion 104a may have a height or thickness in a range of about 0.6 mm to 1.0 mm, e.g. of about 0.8 mm. The first portion 104a may have a height or thickness in a range of about 0.3 mm to 0.8 mm, e.g. of about 0.5 mm. In case the first portion 104a has a height or thickness in a range of about 0.6 mm to 1.0 mm, e.g. of about 0.8 mm, or in case, the first portion 104a may have a height or thickness in a range of about 0.3 mm to 0.8 mm, e.g. of about 0.5 mm, the second portion 104b or cam may have a diameter D2 in a range of about 2.2 to 2.6 mm, e.g. of 2.4 mm, and may have a height in a range of about 0.8 mm to 1.2 mm, e.g. of 1 mm.

The material used for portions 104a and 104b may be steel, for example, soft metal or soft steel, suitable for cold forming, for example, B1 EN 10131-1.00-DC01=1.0330 EN 10130. However, any other material having the same or equal mechanical characterization may be used instead.

Figure 7A:
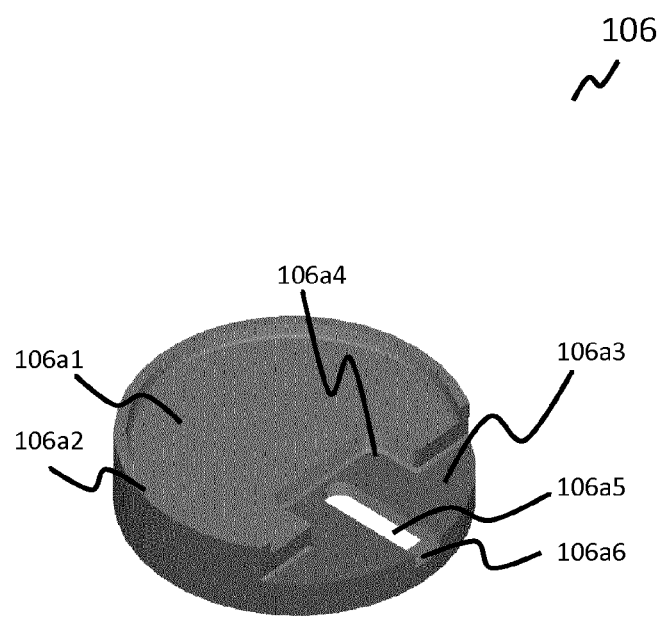
FIGS. 7A and 7B show a casing in schematic three-dimensional views, in accordance with various embodiments.
Figure 7B:
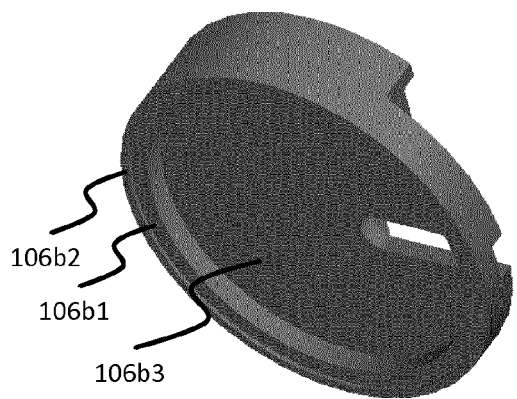

FIG. 7A and FIG. 7B show a casing in schematic three-dimensional views in accordance with various embodiments. The casing 106 may be used in the devices 100a and 100b, as described in view of FIG. 4A to FIG. 4D and FIG. 5A to FIG. 5D. The device 100a and/or the device 100b may include the casing 106 which may include a circular cylindrical shape of a predetermined height h3 (referenced in FIG. 8c). A first side of the casing 106 may include a recess 106a1 of a predetermined depth h5 (referenced in FIG. 8c) and a wall 106a2. A second side of the casing 106 may include a first recess 106b1 of a predetermined depth h7 (referenced in FIG. 8c) and a second recess 106b3 of a predetermined depth h6 (referenced in FIG. 8c) and a wall 106b2. The casing 106 may include a step 106a3 of a predetermined height h9 (referenced in FIG. 8c), and a recess 106a4 of a predetermined length l5 (referenced in FIG. 8d). The casing 106 may include an elongated hole 106a5 of a predetermined depth h8 (referenced in FIG. 8c) and a groove 106a6.

FIG. 8A to FIG. 8D show a casing 106 in schematic views in accordance with various embodiments.

Figure 8A:
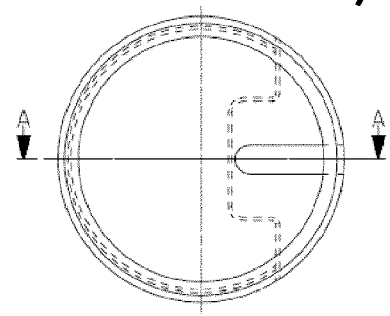
Figure 8B:
Figure 8C:
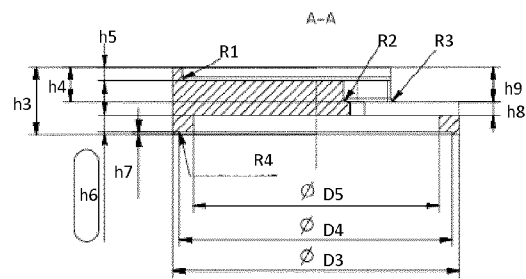
Figure 8D:
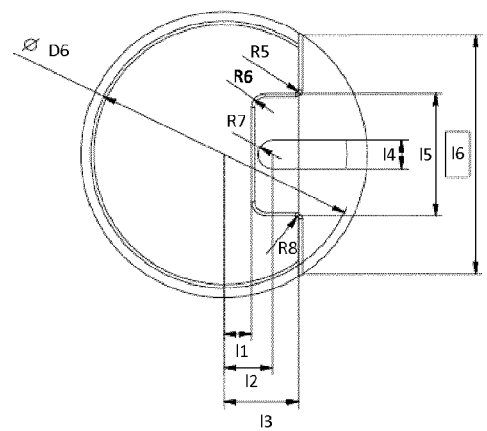

FIG. 8A shows a bottom view of the casing 106. FIG. 8B shows a side view of the casing 106. FIG. 8C shows a sectional view of the casing 106. FIG. 8D shows a top view of the casing 106. The casing 106 may be used in the devices 100a and 100b, as described in view of FIG. 4A to FIG. 4D and FIG. 5A to FIG. 5D. The casing 106 may be manufactured of Polyamide 12 (PA 12). The casing 106 may have mechanical characteristics of yield stress ISO 527 of about 46 MPa dry and 36 MPa at humidity, tensile modulus of elasticity ISO 527 of about 1500 MPa dry and 1100 MPa at humidity. However, any other material having the same or equal mechanical characterization may be used instead.

The casing 106 may have a diameter D3, defining an outer edge of the casing 106, in a range of about 40 mm to 44 mm, e.g. of about 42 mm. The casing 106 may have a diameter D4 in a range of about 38 mm to 42 mm, e.g. of about 40 mm. The casing 106 may have a diameter D5 in a range of about 34 mm to 38 mm, e.g. of about 36 mm. The casing 106 may have a diameter D6 in a range of about 37 mm to 41 mm, e.g. of about 39.19 mm. The thickness or height h3 may be in a range of about 8 mm to 12 mm, e.g. of about 9.9±0.1 mm. The thickness or height h5 may be in a range of about 1 mm to 3 mm, e.g. of about 2 mm. The thickness or height h6 may be in a range of about 2 mm to 3 mm, e.g. of about 2.4±0.05 mm. The thickness or height h7 may be in a range of about 0.2 mm to 1.2 mm, e.g. of about 0.6 mm. The thickness or height h8 may be in a range of about 1.5 mm to 2.5 mm, e.g. of about 2 mm. The thickness or height h9 may be in a range of about 4 mm to 6 mm, e.g. of about 5.1 mm. The casing 106 may have a length l1 in a range of about 3.5 mm to 4.5 mm, e.g. of about 4.0 mm. The casing 106 may have a length l2 in a range of about 5.5 mm to 8.5 mm, e.g. of about 7.1 mm. The casing 106 may have a length l3 in a range of about 10.5 mm to 11.5 mm, e.g. of about 11.0 mm. The casing 106 may have a length l4 in a range of about 3.5 mm to 5.5 mm, e.g. of about 4.3 mm. The length l5 may be in a range of about 17.5 mm to 18.5 mm, e.g. of about 18.0 mm. The casing 106 may have a length l6 in a range of about 34 mm to 36 mm, e.g. of about 35.14 mm. The casing 106 may have a radius R1 in a range of about 0.4 mm to 0.6 mm, e.g. of about 0.5 mm. The casing 106 may have a radius R2 in a range of about 0.4 mm to 0.6 mm, e.g. of about 0.5 mm. The casing 106 may have a radius R3 in a range of about 0.4 mm to 0.6 mm, e.g. of about 0.5 mm. The casing 106 may have a radius R4 in a range of about 0.1 mm to 0.3 mm, e.g. of about 0.2 mm or a radius of maximal 0.2 mm. The casing 106 may have a radius R5 in a range of about 0.4 mm to 0.6 mm, e.g. of about 0.5 mm. The casing 106 may have a radius R6 in a range of about 1.6 mm to 2.6 mm, e.g. of about 2.1 mm. The casing 106 may have a radius R7 in a range of about 1.6 mm to 2.6 mm, e.g. of about 2.1 mm. The casing 106 may have a radius R8 in a range of about 0.4 mm to 0.6 mm, e.g. of about 0.5 mm.

FIG. 9A to FIG. 9D show a support panel 108 in schematic views in accordance with various embodiments.

FIG. 9A shows a top view of the support panel 108. FIG. 9B and FIG. 9C show side views of the support panel 108. FIG. 9D shows a sectional view of the support panel 108.

The support panel 108 may have a length l7 in a range of about 4.5 mm to 6.5 mm, e.g. of about 5.5 mm. The support panel 108 may have a length l8 in a range of about 39 mm to 41 mm, e.g. of about 40 mm. The support panel 108 may have a length l9 in a range of about 14 mm to 24 mm, e.g. of about 19 mm. The support panel 108 may have a length l10 in a range of about 12 mm to 22 mm, e.g. of about 17 mm. The support panel 108 may have a length l11 in a range of about 1.5 mm to 2.5 mm, e.g. of about 2 mm. The support panel 108 may have a length l12 in a range of about 6 mm to 7 mm, e.g. of about 6.5 mm. The support panel 108 may have a length l13 in a range of about 8 mm to 9 mm, e.g. of about 8.5 mm. The support panel 108 may have a length l14 in a range of about 9.5 mm to 11.5 mm, e.g. of about 10.5 mm. The support panel 108 may have a length l15 in a range of about 350 mm to 370 mm, e.g. of about 360 mm. The support panel 108 may have a length l16 in a range of about 346 mm to 366 mm, e.g. of about 356 mm. The support panel 108 may have a length l17 in a range of about 0.3 mm to 0.7 mm, e.g. of about 0.5 mm. The support panel 108 may have a length l18 in a range of about 46.5 mm to 56.5 mm, e.g. of about 51.5 mm. The support panel 108 may have a length l19 in a range of about 0.7 mm to 1.7 mm, e.g. of about 1.2 mm. The support panel 108 may have a length l20 in a range of about 200 mm to 232 mm, e.g. of about 216 mm. The support panel 108 may have a length l21 in a range of about 210 mm to 230 mm, e.g. of about 220 mm. The support panel 108 may have a length l22 in a range of about 1.5 mm to 2.5 mm, e.g. of about 2 mm. The support panel 108 may have a length l23 in a range of about 0.5 mm to 1.5 mm, e.g. of about 1 mm. The support panel 108 may have a length l24 in a range of about 0.5 mm to 1.5 mm, e.g. of about 1 mm. The support panel 108 may have a length l25 in a range of about 0.5 mm to 1.5 mm, e.g. of about 1 mm. The support panel 108 may have a radius R9, R10, and R12 in a range of about 0.5 mm to 1.5 mm, e.g. of about 1 mm. The support panel 108 may have a radius R11 in a range of about 2.5 mm to 3.5 mm, e.g. of about 3 mm. A material used for support panel 108 may be steel, for example, austenitic stainless steel, for example, B1 ISO 9445-1.00-X5CrNi 18-10=1.4301 EN 10088-2, for example, brushed corned 120. However, any other material having the same or equal mechanical characterization may be used instead.

A U-turned portion 112 of the support portion 108 may be provided, for example, by bending a portion of the support portion 108, as schematically illustrated in FIG. 9A, FIG. 9B, and FIG. 9D. The U-turned portion 112 may be bent such, that an end portion of the U-turned portion 112 may be aligned parallel to a main portion of the support portion 108, on which objects may be put.

FIG. 10A to FIG. 10D show a weighing device 110 for weighing of objects in schematic views in accordance with various embodiments.

FIG. 10A shows a bottom view of the weighing device 110 in accordance with various embodiments. FIG. 10B and FIG. 10C show side views of the weighing device 110 in accordance with various embodiments. FIGS. 10D and 10E show sectional views of the weighing device 110 in accordance with various embodiments.

The weighing device 110 may include at least one, e.g. four devices 100a, 100a, 100b, 100b for measuring forces, e.g. two devices 100a for measuring forces and two devices 100b for measuring forces. The material used for the first and second portions of the force input device may be steel, for example, soft metal or soft steel, suitable for cold forming, for example, B1 EN 10131-1.00-DC01=1.0330 EN 10130, and the material of the casing may be Polyamide (PA) 12, the material of the support panel may be steel, for example, soft metal or soft steel, suitable for cold forming, for example, B1 EN 10131-1.00-DC01=1.0330 EN 10130. The sensor includes at least a coil and a printed circuit board. The casing 106, the sensor 102, and the force input device 104 may be coupled using glue, for example, Cyanoacrylate (CA), for example, Loctite 401 or Loctite 406, as shown in FIG. 10D (Pos1) and FIG. 10E (Pos2).

The devices 100a and 100b may be positioned in an edge portion of the support plate 108, respectively, and such, that a device 100a may be adjacent to a device 100b, respectively, as, for example, schematically illustrated in FIG. 10A. As schematically illustrated in FIG. 10A and FIG. 10D, devices 100a may be arranged such that a portion of a sensor 102 in a casing 106 of the device 100a may be next or adjacent to a U-turned portion 112 of the support panel 108, as schematically illustrated in FIG. 10A and FIG. 10D. At least one sensor 102 may be configured to measure a distance to a surface of at least one U-turned portion of the support panel 108.

At least two sensors 102 of devices 100a may be configured such that the sensors 102 of the devices 100a may be close to the U-turned portion 112 of the support panel 108 (as schematically illustrated in left bottom position and right upper position of the support panel in FIG. 10A) and may be configured to measure with high resolution in case a small amount of load may be applied to the support panel 108.

At least two sensors 102 of devices 100b may be configured such that the sensors 102 of the devices 100a may be configured to measure with high resolution in case a huge amount of load may be applied to the support panel 108, as schematically illustratively in the sectional views in FIG. 10D and FIG. 10E.

At least two sensors 102 of devices 100b may be configured such that the sensors 102 of the devices 100b may be close to the sensors 102 and may be configured to measure with high resolution in case a small amount of load may be applied to the support panel 108. At least two sensors 102 of devices 100a may be configured such that the sensors 102 of the devices 100a may be farther away from the U-turned portion 112 of the support panel 108 and may be configured to measure with high resolution in case a huge amount of load may be applied to the support panel 108.

A weighing device 110 having a high resolution under small load influence and under high load influence may be achieved because the plurality of sensors 100a, 100b may be operated in their effective range.

Figure 11:
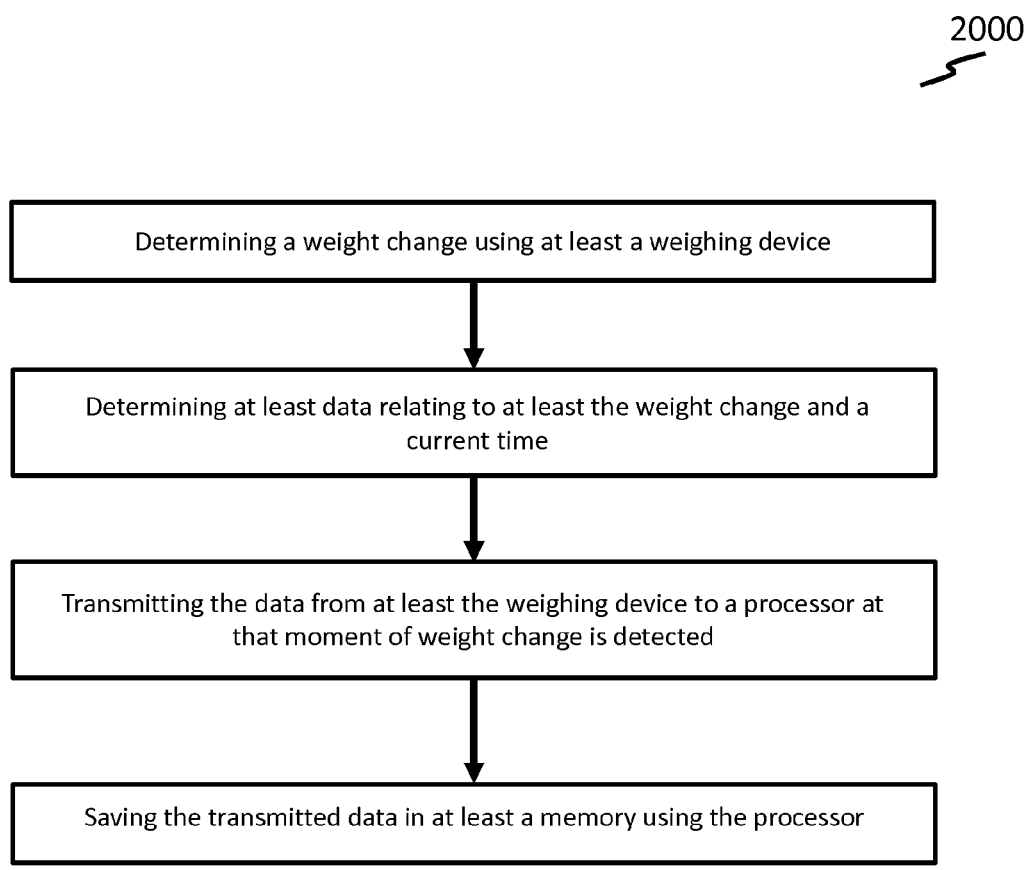
FIG. 11 shows a flow chart of a method for managing inventory, in accordance with various embodiments.

FIG. 11 shows a flow chart 2000 of a method for managing inventory in accordance with various embodiments.

The method may include: determining a weight change using at least a weighing device, determining at least data relating to at least the weight change and a current time, transmitting the data from at least the weighing device to a processor at that moment of weight change may be detected, storing the transmitted data in at least a memory using the processor.

Determining at least data may further include taking a current time from a quartz, a clock, a clock of a processor or of a personal computer.

The features mentioned above in conjunction with exemplary or specific examples may also be applied to further examples mentioned above and vice versa. Further, effects mentioned in relation to the system also refer to the method and vice versa.

In the following, various examples are provided with reference to the Figures and embodiments described above.

Example 1 is a system for managing inventory, including: a plurality of weighing devices, at least a memory, at least a processor. The weighing devices are configured to weight at least an object. The processor is configured to receive data from at least a weighing device relating to the at least one object weighed by the respective weighing device, and to store the received data in the memory. The processor is further configured to determine at least a matching of data received from a first weighing device with data received from at least a second weighing device.

In Example 2, the system of Example 1 may optionally include that the plurality of weighing devices is configured such that all weighing devices include a single type of device for measuring the weight of the objects.

In Example 3, the system of Example 1 or 2 may optionally include that each of the plurality of weighing devices is configured to include a plurality of devices. The devices are configured to include at least a sensor, a force input device, and a casing.

In Example 4, the system of Example 1 to 3 may optionally include that the plurality of weighing devices and the processor are configured to communicate data using a near field communication device.

In Example 5, the system of Example 1 to 4 may optionally include that the weighing devices are configured to transmit at least data relating to a change of weight determined by the weighing device to the processor, and at least a timestamp. The timestamp is configured such that it may be generated in case a change of weight is determined by the at least one weighing device.

In Example 6, the system of Example 1 to 5 may optionally include that the timestamp includes a current time.

In Example 7, the system of Example 1 to 6 may optionally include that the system further includes at least a trolley, and wherein the trolley is configured to include at least a weighing device.

In Example 8, the system of Example 1 to 7 may optionally include that the trolley includes a Radio-Frequency-interface.

In Example 9, the system of Example 1 to 8 may optionally include that the weighing device is mechanically uncoupled such that it only measures the content in a basket of the trolley.

In Example 10, the system of Example 1 to 9 may optionally include a plurality of shelves, and wherein the shelves are each configured to include at least a weighing device.

In Example 11, the system of Example 1 to 10 may optionally include a back office, wherein the back office includes the processor and/or the memory, wherein the memory includes at least a data set.

In Example 12, the system of Example 1 to 11 may optionally include at least an entrance, and an exit.

In Example 13, the system of Example 1 to 12 may optionally include a checkout, wherein at the checkout no influence through the customer is possible, and wherein at the checkout a communication between the weighing device and the processor is provided.

In Example 14 a method for managing inventory is provided, including: determining a weight change using at least a weighing device, determining at least data relating to at least the weight change and a current time, transmitting the data from at least the weighing device to a processor at that moment of weight change is detected, and storing the transmitted data in at least a memory using the processor.

In Example 15, the method of Example 14 may optionally include: detecting a weight change using a weighing device in a trolley, storing data relating to the weight change and a current time at that moment of weight change is detected using at least a processor.

In Example 16, the system of Example 14 or 15 may optionally include: Positioning a trolley in a point of checkout where no influence through a customer is provided, establishing a communication between the trolley and a processor, transmitting the stored data relating to at least a determined weight change and at least a corresponding timestamp to the processor, verifying the data to logs from weighing devices, generating a digital basket using the processor, sending a complete bill to the customer, paying of the bill by the customer, after successfully paying the bill, releasing the trolley from the checkout.

In Example 17, the system of Example 14 to 16 may optionally include: weighing the trolley using a weighing device in the floor at the checkout where no influence through the customer is provided.

In Example 18, the system of Example 1 to 13 may optionally include that the system is further configured to provide at the entrance a weighing device for weighing of the trolley and/or a customer.

In Example 19, the system of Example 1 to 13 may optionally include that the back office further includes a server and/or a cloud storage.

Example 20 is a device for measuring forces, including: at least one sensor, at least one force input device configured to elastically deform in relation to an external force acting on the device, and a casing coupled to the sensor and the force input device, wherein the sensor is configured such that, in case the force is applied to the device, the sensor detects the force in relation to the elastic deformation of the force input device, and wherein the casing is configured to accommodate the sensor in the casing in at least two different positions.

In Example 21, the device of Example 20 may optionally include that the sensor is an inductive sensor and/or wherein the force input device is made from an electric conductive material.

In Example 22, the device of Example 20 or 21 may optionally include that the sensor includes at least one of a coil, a magnetic core, an oscillator, a demodulator, a flip-flop, a comparator, an output stage, and a printed circuit board.

In Example 23, the device of Example 20 to 22 may optionally include that the sensor is enclosed by the casing or wherein the sensor is partially enclosed by the casing.

In Example 24, the device of Example 20 to 23 may optionally include that the sensor further includes an integrated RFID communication device, configured such, that depending on the acting force the sensor communicates data to an external device using the integrated RFID communication device.

In Example 25, the device of Example 20 to 24 may optionally include that the force input device includes a circular disk shape, wherein the force input device is of an elastic material, and wherein at least one protrusion is provided at a center position of the force input device, and wherein the protrusion 104b is orientated away from the casing 106.

In Example 26, the device of Example 20 to 25 may optionally include that the force input device and/or the sensor are/is coupled to the casing using glue.

In Example 27, the device of Example 20 to 26 may optionally include that the force input device and the casing are arranged concentrically.

In Example 28, the device of Example 20 to 27 may optionally include that the casing includes a circular cylindrical shape of a predetermined height, wherein a first side of the casing includes a recess of a predetermined depth, wherein a second side of the casing includes a first recess of a predetermined depth and a second recess of a predetermined depth, wherein the casing includes a step of a predetermined height, and a recess of a predetermined length, and wherein the casing further includes an elongated hole of a predetermined depth.

In Example 29, the device of Example 20 to 28 may optionally include that the casing is made of Polyamide 12, and/or wherein the force input device is made of steel.

Example 30 is a weighing device for weighing of objects, including: a plurality of devices for measuring forces, and at least one support panel, wherein each device is arranged at an edge corner portion of a first surface of the support panel, respectively, and wherein the devices are coupled to the first surface of the support panel such, that at least one device is coupled to the support panel using a first side of the device, and that at least one further device is coupled to the support panel using a second side of the further device, wherein the second side is an opposite side of the first side.

In Example 31, the weighing device of Example 30 may optionally include that adjacent devices of the plurality of devices are coupled to the support panel using alternating the first side of the device and the second side of the device.

In Example 32, the weighing device of Example 31 to 32 may optionally include that the support panel includes a plate shape of a predetermined height and is made of an electric conductive material, wherein at least one edge portion of the support panel includes a U-turned portion, wherein the U-turned portion is configured to partially overlap at least one device of the plurality of devices, wherein the U-turned portion of the support panel and the at least one sensor are configured such that, in case a force is applied to the force input device using the support plate, the at least one sensor measures a change in an electromagnetic field generated by the sensor due to movement of the respective U-turned portion, and wherein the sensor is partially enclosed by the casing.

In Example 33, the weighing device of Example 30 to 32 may optionally include that a portion of the support panel is configured to accommodate an electronic device, wherein the electronic device is configured to communicate with at least one sensor of the at least one device, and is further configured to communicate data to an external device using Radio-Frequency-Identification (RFID) transmission.

In Example 34, the weighing device of Example 30 to 33 may optionally include that at least one device is coupled to the support panel using glue.

While the invention has been particularly shown and described with reference to specific examples, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. A system for managing inventory, comprising:
   at least one shelf comprising:
      a first weighing device configured to weigh at least one object positioned on the at least one shelf,
      a first communication device;
   at least one trolley comprising:
      a second weighing device configured to weigh at least one object received in the at one trolley,
      at least one memory,
      at least one processor configured to receive data from the second weighing device relating to the at least one object weighed by the second weighing device and also configured to store the received data in the at least one memory
      a second communication device;
   a processor arrangement comprising:
      at least one memory,
      at least one processor configured to:
         receive data from the first communication device relating to a weight of the at least one object positioned on the at least one shelf and weighed by the first weighing device, store the data received from the first weighing device in the at least one memory of the processor arrangement, receive data from the second communication device stored in the at least one memory of the at least one trolley relating to a weight of the at least one object received in the at least one trolley and weighed by the second weighing device, and determine at least a matching of the data received from the first communication device with the data received from the second communication device;

wherein the system further comprises a back office and wherein the back office comprises the processor arrangement;

wherein each of the first weighing device and the second weighing device comprises a plurality of devices for measuring forces, wherein each of the plurality of devices for measuring forces are modular with respect to each other, such that a first device of the plurality of devices for measuring forces may be exchanged with a second device of the plurality of devices for measuring forces and vice versa;

wherein each of the plurality of devices for measuring forces comprises:

at least one sensor, a force input device, and a casing wherein each of the at least one sensor includes a communication device to communicate data to one of the second communication device of the at least one trolley and the first communication device of the at least one shelf;

wherein:

the at least one sensor of the first device of the plurality of devices for measuring forces extends beyond an edge of the casing of the first device of the plurality of devices for measuring forces, and the at least one sensor of the second device of the plurality of devices for measuring forces is positioned within an edge of the casing of the second device of the plurality of devices for measuring forces; and a support panel having at least one u-turned portion such that an end portion of the u-turned portion is aligned and parallel to a main portion of the support portion, wherein a portion of the at least one sensor of the first device of the plurality of devices for measuring forces is adjacent to the u-turned portion of the support panel, the at least one sensor configured to measure a distance to a surface of at least one u-turned portion, wherein the u-turned portion partially overlaps the first device of the plurality of devices for measuring forces.

2. The system of claim 1 wherein the first communication device and the second communication device and the processor are further defined as configured to communicate data using near field communication.

3. The system of claim 1 wherein the received by the processor from at least one of the first communication and the second communication device further comprises at least a timestamp, wherein the timestamp is configured such that it is generated in a case of a change of weight determined by the respective one of the first weighing device and the second weighing device.

4. The system of claim 3, wherein the timestamp comprises a current time as to the change of weight determined by the respective one of the first weighing device and the second weighing device.

5. The system of claim 1 wherein at least one of the second communication device is an RFID device and the at least one trolley further comprises a Radio-Frequency-interface for communicating with the at least one of one of the plurality of devices for measuring forces of the second weighing device.

6. The system of claim 1 wherein the second weighing device is configured to be mechanically uncoupled such that it only measures the weight of the content in a basket of the at least one trolley.

7. The system of claim 1 wherein the at least one shelf further comprises:

a plurality of shelves wherein each of the plurality of shelves comprises a respective first weighing device.

8. The system of claim 1 further comprising:

a store having at least an entrance and an exit.

9. The system of claim 8 further comprising:

a checkout near the exit, wherein, only at the checkout, communication between the second communication device of the at least one trolley and the at least one processor of the processor arrangement is provided.

10. A method for managing inventory comprising:

providing a plurality of weighing devices in a store having a entrance and an exit with a checkout at the exit, wherein each of the weighing devices comprises at least one device for measuring forces that includes at least one sensor, a force input device, and a casing, and wherein each sensor includes a communication device to communicate data to a first communication device of a trolley moveable by a customer within the store and a second communication device of a shelf positioned within the store;

determining a first weight change with a first weighing device of the plurality of weighing devices, the first weight device positioned in the shelf, and the first weight change occurring when a first piece of inventory is removed from the shelf;

determining first data relating to at least the first weight change and to a first timestamp of said determining the first weight change;

transmitting the first data from at least the weighing device to a processor of a processor arrangement at the moment the weight change is detected with the second communication device of the shelf;

storing the transmitted, first data in at least one memory of the processor arrangement using the processor of the processor arrangement;

determining a second weight change with a second weighing device of the plurality of weighing device, the second weighing device in the trolley, the second weight change occurring when the first piece of inventory is placed in the trolley;

determining second data relating to at least the second weight change and to a second timestamp of determining the second weight change;

storing second data at the moment the weight change is detected, in a memory of the trolley;

wherein the processor arrangement is positioned in a back office of the store;

wherein each device for measuring forces is modular such that a first device for measuring forces in a first weighing device of the plurality of weigh devices may be exchanged by a second device for measuring forces in a second weighing device of the plurality of weigh devices and vice versa;

transmitting the second data from the trolley to the processor arrangement only when the trolley is at the checkout of the store;

comparing, with the processor of the processor arrangement, the first data and the second data;

generating an output of a bill after said comparing when the first data matches the second data; and providing a support panel having at least one u-turned portion such that an end portion of the u-turned portion is aligned and parallel to a main portion of the support portion, wherein a portion of the at least one sensor of the first device of the plurality of devices for measuring forces is adjacent to the u-turned portion of the support panel, the at least one sensor configured to measure a distance to a surface of at least one u-turned portion, wherein the u-turned portion partially overlaps the first device of the plurality of devices for measuring forces.

11. The method of claim 10 further comprising:
configuring the trolley to, before starting said transmitting the second data at the checkout, wait for a wake up signal from the back office.

12. The method of claim 10 further comprising:
receiving the trolley at the checkout in one of a gate and a closed room.

13. The method of claim 10 further comprising:
transmitting a shelf identification code with the first data with the second communication device of the shelf.

14. The method of claim 10 wherein said generating step further comprises:
generating an output of a bill to a display device of one of a tablet and smartphone after said comparing when the first data matches the second data.

15. The system of claim 1 wherein:
the force input device of the first device of the plurality of devices for measuring forces is aligned upwards; and
the force input device of the second device of the plurality of devices for measuring forces is aligned downwards.

* * * * *